US006493663B1

(12) United States Patent
Ueda

(10) Patent No.: US 6,493,663 B1
(45) Date of Patent: Dec. 10, 2002

(54) DOCUMENT SUMMARIZING APPARATUS, DOCUMENT SUMMARIZING METHOD AND RECORDING MEDIUM CARRYING A DOCUMENT SUMMARIZING PROGRAM

(75) Inventor: Yoshihiro Ueda, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/454,863

(22) Filed: Dec. 7, 1999

(30) Foreign Application Priority Data

Dec. 17, 1998 (JP) .......................................... 10-358596
Aug. 11, 1999 (JP) .......................................... 11-227638

(51) Int. Cl.$^7$ .............................................. G06F 17/27
(52) U.S. Cl. .......................................... 704/9; 707/531
(58) Field of Search .................. 704/1, 9, 10; 707/530, 707/531, 532

(56) References Cited

U.S. PATENT DOCUMENTS

| | | | | |
|---|---|---|---|---|
| 5,426,583 A | * | 6/1995 | Mendibil ........................ | 704/2 |
| 5,444,617 A | * | 8/1995 | Merialdo ........................ | 704/9 |
| 5,510,981 A | * | 4/1996 | Berger et al. .................. | 704/2 |
| 5,659,765 A | * | 8/1997 | Nii ................................ | 704/4 |
| 5,768,603 A | * | 6/1998 | Brown et al. .................. | 704/9 |
| 5,907,821 A | * | 5/1999 | Kaji et al. ...................... | 704/4 |
| 6,161,083 A | * | 12/2000 | Franz et al. .................... | 704/4 |

FOREIGN PATENT DOCUMENTS

| | | |
|---|---|---|
| JP | A 5-225256 | 9/1993 |
| JP | A-10-134066 | 5/1998 |

OTHER PUBLICATIONS

T. Ogawa, et al., *Assignment of Characteristic Representation for Discriminating Document Clusters*, The Association for Natural Language Processing, Proceedings of 5$^{th}$ Annual Meeting, pp. 209–212, Mar. 1999.

J. Toyoura, et al., *Proposal of a Method for Summarizing Plural Texts Using a Network*, The Association for Natural Language Processing, Proceedings of 5$^{th}$ Annual Meeting, pp. 225–226, Mar. 1999.

D. Cutting et al., "*Scatter/Gather: A Cluster–based Approach to Browsing Large Document Collections*", SIGIR'95/Denmark, Jun. 1992, pp. 318–329, 1992.

K. Mckeown et al., "*Generating Summaries of Multiple News Articles*", SIGIR95 Seattle, pp. 74–82, 1995.

T. Funasaka et al., "*Relevant Newspaper Articles Summarization by Redundancy Reduction*", 114–7, pp. 39–46, 1996.

S. Shibata et al., "*A Fusion of Overlapped Documents*", 120–12, pp. 77–82, 1997.

* cited by examiner

Primary Examiner—Patrick N. Edouard
(74) Attorney, Agent, or Firm—Oliff & Berridge, PLC

(57) ABSTRACT

A document summarizing apparatus generates a comprehensive summary on a group of documents of relatively diverse contents. The structure of documents specified to be processed is analyzed in a phrase analyzing unit to generate analytic trees describing the dependencies between words. An analytic tree scoring unit adds scores to the analytic trees in accordance with their importance. An analytic tree score accumulating unit accumulates scored trees to unify the trees expressing the same concept to increases the scores added to the unified analytic trees. A sentence synthesizing unit then selects the trees with higher scores from within the set of analytic trees stored in the analytic tree score accumulating unit to synthesize a summary from the selected analytic trees. The present invention allows less limitation to be applied to the documents to be processed, as well as a comprehensive summary to be generated.

8 Claims, 24 Drawing Sheets

FIG. 6

SET OF ANALYTIC TREES 40

| | | | | | | | |
|---|---|---|---|---|---|---|---|
| TELECOM | MAJOR | HOOBAR | 50g | PORTABLE | PHONE | SELLS | 41 |
| φ | MAJOR | HOOBAR | 50g | PORTABLE | PHONE | SELLS | 42a |
| TELECOM | MAJOR | HOOBAR | φ | PORTABLE | PHONE | SELLS | 42b |
| TELECOM | MAJOR | HOOBAR | 50g | φ | PHONE | SELLS | 42c |
| φ | φ | HOOBAR | 50g | PORTABLE | PHONE | SELLS | 42d |
| φ | MAJOR | HOOBAR | φ | PORTABLE | PHONE | SELLS | 42e |
| φ | MAJOR | HOOBAR | 50g | φ | PHONE | SELLS | 42f |
| φ | φ | HOOBAR | φ | PORTABLE | PHONE | SELLS | 42g |
| φ | φ | HOOBAR | 50g | φ | PHONE | SELLS | 42h |
| φ | MAJOR | HOOBAR | φ | PORTABLE | PHONE | SELLS | 42i |
| φ | φ | φ | 50g | PORTABLE | PHONE | SELLS | 42j |

FIG. 7

SET OF ANALYTIC TREES 40

| | | | | | | | SCORE | |
|---|---|---|---|---|---|---|---|---|
| TELECOM | MAJOR | HOOBAR | 50g | PORTABLE | PHONE | SELLS | 7 | 41 |
| φ | MAJOR | HOOBAR | 50g | PORTABLE | PHONE | SELLS | 6 | 42a |
| TELECOM | MAJOR | HOOBAR | φ | PORTABLE | PHONE | SELLS | 6 | 42b |
| TELECOM | MAJOR | HOOBAR | 50g | φ | PHONE | SELLS | 6 | 42c |
| φ | φ | HOOBAR | 50g | PORTABLE | PHONE | SELLS | 5 | 42d |
| φ | MAJOR | HOOBAR | φ | PORTABLE | PHONE | SELLS | 5 | 42e |
| φ | MAJOR | HOOBAR | 50g | φ | PHONE | SELLS | 5 | 42f |
| φ | φ | HOOBAR | φ | PORTABLE | PHONE | SELLS | 4 | 42g |
| φ | φ | HOOBAR | 50g | φ | PHONE | SELLS | 4 | 42h |
| φ | MAJOR | φ | φ | φ | PHONE | SELLS | 4 | 42i |
| φ | φ | φ | 50g | PORTABLE | PHONE | SELLS | 4 | 42j |

FIG. 8

SET OF ANALYTIC TREES
43

| | | | | | SCORE | NO. OF ELEMENTS | NO. OF OCCURRENCES | |
|---|---|---|---|---|---|---|---|---|
| HOOBAR | 50g | PORTABLE | PHONE | SELLS | 30 | 5 | 6 | 43a |
| HOOBAR | PORTABLE | PHONE | SELLS | | 48 | 4 | 12 | 43b |
| HOOBAR | PHONE | SELLS | | | 39 | 3 | 13 | 43c |
| HOOBAR | ETHNIC | MUSIC | CONCERT | SUPPORTS | 20 | 5 | 4 | 43d |
| HOOBAR | SIMON CITY | HISTORY | ART MUSEUM | SUPPORTS | 40 | 5 | 8 | 43e |
| HOOBAR | ASIAN | CULTURE | SUPPORTS | | 4 | 4 | 1 | 43f |
| HOOBAR | SATELLITE | PORTABLE | PHONE | STUDIES | 35 | 5 | 7 | 43g |
| HOOBAR | PORTABLE | PHONE | STUDIES | | 32 | 4 | 8 | 43h |
| HOOBAR | CITIZEN | FAIR | SPONSORS | | 20 | 4 | 5 | 43i |

FIG. 9

SET OF ANALYTIC TREES 43

| | | | | SCORE | NO. OF ELEMENTS | NO. OF OCCURRENCES |
|---|---|---|---|---|---|---|
| HOOBAR | PORTABLE | PHONE | SELLS | 48 | 4 | 12 | — 43b
| HOOBAR | SIMON CITY | HISTORY | ART MUSEUM | SUPPORTS | 40 | 5 | 8 | — 43e
| HOOBAR | PHONE | SELLS | | 39 | 3 | 13 | — 43c
| HOOBAR | SATELLITE | PORTABLE | PHONE | STUDIES | 35 | 5 | 7 | — 43g
| HOOBAR | PORTABLE | PHONE | STUDIES | | 32 | 4 | 8 | — 43h
| HOOBAR | 50g | PORTABLE | PHONE | SELLS | 30 | 5 | 6 | — 43a

. . .

| | | | | | | |
|---|---|---|---|---|---|---|
| HOOBAR | CITIZEN | FAIR | SPONSORS | | 20 | 4 | 5 | — 43i
| HOOBAR | ETHNIC | MUSIC | CONCERT | SUPPORTS | 20 | 5 | 4 | — 43d
| HOOBAR | ASIAN | CULTURE | SUPPORTS | | 4 | 4 | 1 | — 43f

FIG. 16

| INDEX | FIRST CANDIDATE | | SECOND CANDIDATE | | THIRD CANDIDATE | |
|---|---|---|---|---|---|---|
| | DEPENDENCY | DEGRESSION RATE | DEPENDENCY | DEGRESSION RATE | DEPENDENCY | DEGRESSION RATE |
| GA (-NOMINATIVE) | HA (-NOMINATIVE) | 0.4 | | | | |
| HA (-NOMINATIVE) | GA (-NOMINATIVE) | 0.6 | WO (-ACCUSATIVE) | 0.4 | | |
| NI (-DATIVE) | NITAISHITE (-DATIVE) | 0.5 | HE (-DATIVE) | 0.3 | | |
| NO (-"OF") | GA (-NOMINATIVE) | 0.5 | WO (-ACCUSATIVE) | 0.5 | φ | 0.7 |
| .... | .... | | .... | | .... | |

RELATIONAL TABLE
111

FIG. 18

PER VERB RELATIONAL TABLE 112

| INDEX | VERB | FIRST CANDIDATE | | SECOND CANDIDATE | | THIRD CANDIDATE | | |
| --- | --- | --- | --- | --- | --- | --- | --- | --- |
| | | DEPENDENCY | DEGRESSION RATE | DEPENDENCY | DEGRESSION RATE | DEPENDENCY | DEGRESSION RATE | |
| NI (-DATIVE) | — | NITAISHITE (-DATIVE) | 0.5 | HE (-DATIVE) | 0.3 | | | |
| NI (-DATIVE) | GO | HE (-DATIVE) | 0.8 | | | | | |
| NI (-DATIVE) | DO | NITAISHITE (-DATIVE) | 0.6 | | | | | |
| NI (-DATIVE) | GIVE | NITAISHITE (-DATIVE) | 0.6 | HE (-DATIVE) | 0.5 | | | |
| .... | .... | .... | .... | .... | .... | .... | .... | .... |

FIG. 19

PER LANGUAGE STRUCTURE

| LANGUAGE STRUCTURE | CONVERSION RULES | | DEGRESSION RATE |
|---|---|---|---|
| PASSIVE→ACTIVE | GA(-NOMINATIVE)-NI(-DATIVE) | WO(-ACCUSATIVE)-GA(-NOMINATIVE) | 0.7 |
| ACTIVE→PASSIVE | GA(-NOMINATIVE)-KARA(-"FROM") | WO(-ACCUSATIVE)-GA(-NOMINATIVE) | 0.7 |
| CAUSATIVE→DECLARATIVE | NI(-DATIVE) | GA(-NOMINATIVE) | 0.5 |
| INTRANSITIVE→TRANSITIVE | GA(-NOMINATIVE) | WO(-ACCUSATIVE) | 0.5 |
| TRANSITIVE→INTRANSITIVE | WO(-ACCUSATIVE) | GA(-NOMINATIVE) | 0.5 |
| | .... | | |

113

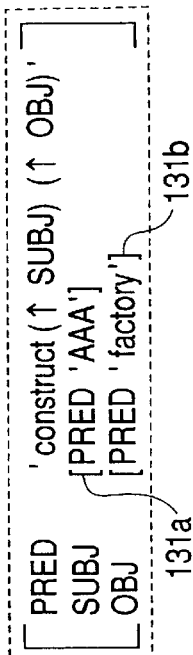
FIG. 20A  AAA constructed a factory
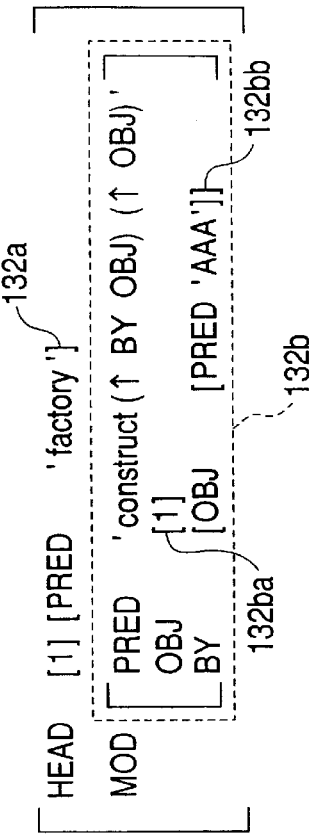
FIG. 20B  the factory constructed by AAA
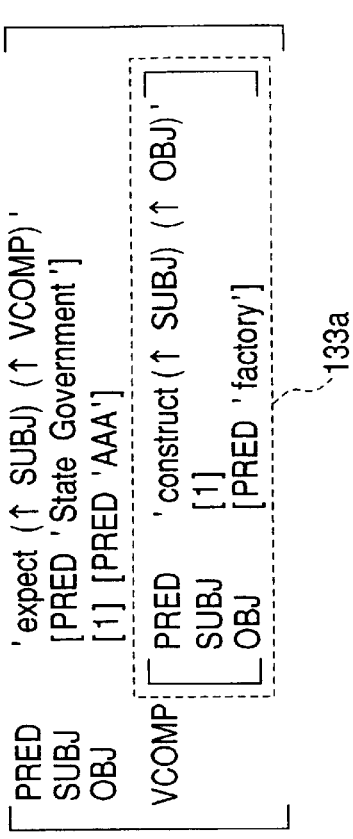
FIG. 20C  State government expect AAA to construct a factory

FIG. 24A
PATTERN DICTIONARY ENTRY 161
| ELEMENTARY STRUCTURE | STYLE | GENERATION PATTERN |
|---|---|---|
| 162a | S | '(NP arg1) constructed (NP arg2)' |
| 162b | S | '(NP arg1) construct (NP arg2)' |
| 162c | NP | '(POSSESS arg1) construction of (NP arg2)' |
| 162c | to-VP | 'for (NP arg1) to construct (NP arg2)' |
| 162d | V-ing | '(POSSESS arg1) constructing (NP arg2)' |
164a, 164b, 164c, 164d, 164e
FIG. 24B
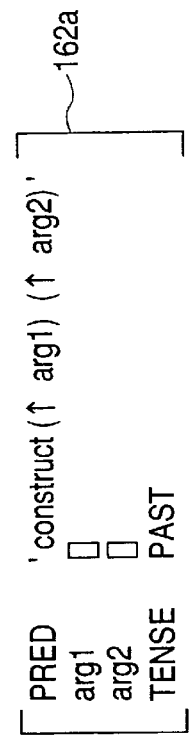
[ PRED  'construct (↑ arg1) (↑ arg2)'
  arg1  □
  arg2  □
  TENSE PAST ] — 162a
FIG. 24C
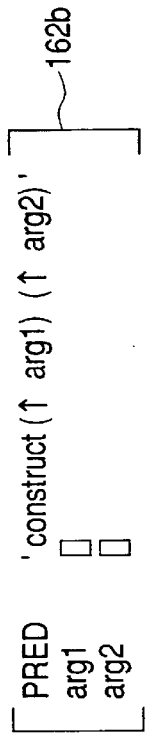
[ PRED  'construct (↑ arg1) (↑ arg2)'
  arg1  □
  arg2  □ ] — 162b

DOCUMENT SUMMARIZING APPARATUS, DOCUMENT SUMMARIZING METHOD AND RECORDING MEDIUM CARRYING A DOCUMENT SUMMARIZING PROGRAM

BACKGROUND OF THE INVENTION

1. Field of the Invention

The present invention relates to a document summarizing apparatus, a document summarizing method and a recording medium storing a document summarizing program, more specifically to a document summarizing apparatus, a document summarizing method and a recording medium storing a document summarizing program for creating a summary holding the overview of a group of a plurality of documents.

2. Description of the Related Art

A variety of document summarizing technologies has been studied and some working technologies have been practically developed. However, the almost all of the document summarizing technologies of the related arts are targeted to one single document. In practice, there are needs for summarizing a plurality of documents for picking up the overview thereof. These methods developed for only summarizing one document are not applicable to a collection of documents and they result in an inappropriate summary.

Examples of popular methods in the related art include a method of picking up important sentences, and a method of abstracting. In the related art, based on the frequency of appearance of words, a location in a document or in a paragraph, usage of proper nouns and so on, a score is given for each sentence of the document Sentences with higher scores are picked up until the number of sentences or the whole length of summary becomes equal to a pre-selected value to enumerate them to create a summary. If such a method is applied to a plurality of documents, sentences that will be selected from one of documents in a group will represent a group of documents and may not be appropriate for a summary thereof.

There are needs for summarizing a plurality of documents. Summarizing technologies for a plurality of documents may include:

(1) Enumeration of Keywords

The keyword enumeration method enumerate the most frequent words appeared in a document cluster. One example is the classification technology documented in the paper of Cutting, et al., "Scatter/Gather: A cluster-based Approach to Broweing Large Document Collection", SIGIR-92 (1992). Some inventions based on this method include the Japanese Published Unexamined Patent Application No. Hei 5-225256, and the U.S. patent application Ser. No. 5,442,778. A preselected number of keywords that appeared frequently in the group of documents will be enumerated.

(2) Generation of Sentences Based on the Extracted Meanings

A method of sentence-synthesis based on the extracted meanings is described in the paper of McKeown and Radev, "Generating Summaries of Multiple News Articles" SIGIR-95 (1995); one example thereof is SUMMONS (SUMMarizing Online NewS articles). This technology uses slots in a given template to be fulfilled with information extracted from a plurality of documents. The information embedded in the template will be used as the conceptual structure for generating a summary of a pattern matched with the syntax.

(3) Synthesis of Following-up Articles

The technology described in the paper by Funasaka, Yamamoto and Masuyama, "Summarizing relational news articles by reducing redundancy" Natural Language Processing, 114-7 (1996) generates a summary or a plurality of documents by reducing redundancy from between a plurality of following-up news articles and synthesizing them. The following-up news articles, in general, may contain some paragraphs describing the course of an event as the background. The description of the background will be redundant if there is an article on the background. Accordingly reducing the redundancy between articles and synthesizing them may generate a summary without redundancy.

(4) Synthesis of a Plurality of Sentences

In this method a summary will be synthesized by identifying the sentences sharing the same meaning from between articles of the same event (for example, news articles of a plurality of news companies describing the same affair).

The document summarizing apparatus disclosed in the Japanese Published Unexamined Patent Application No. Hei 10-134066 gathers similar paragraphs (of online news of other news companies) to a specified paragraph (of online news). The gathered paragraphs are then disassembled to sentences to regroup similar sentences Here the similar sentences may be defined to have the number of pattern-matched words greater than a threshold value. For example, "Typhoon #5, landing in Kyushu" or "a large typhoon #5 lands in Kyushu", etc.

A representative sentence for each of these groups will be generated. The manners to generate a representative sentence may comprises, for example, selecting one therefrom, generating a common set of blocks, or generating a union set. The common set of the example above may be "Typhoon #5, landing in Kyushu" and the union set may be "a large typhoon #5 lands in Kyushu".

A method disclosed in the paper by Shibata. et al., "Merging a Plurality of Documents", Association of Natural Language Processing 120-2 (1997) also identifies a common sentence sharing the similar meanings from news articles of a plurality of news companies describing a same affair to synthesize a set therefrom. The manners of synthesis comprises an "AND" set (common set of elements), and an "OR" Set (union set of elements)

However, the technologies of the Prior Art suffers from the problems as follows:

(1) The enumeration of keywords cannot indicate the relational dependencies between words, since words are appeared independently. The reader has to guess the meaning behind them from the sequential order of keywords and from a variety of knowledge thereon. In order to guess what the collection of documents would say, the reader is required to have some knowledge on the field of the subject or the knowledge on the event described in the collected documents.

(2) The generation of sentences from the extracted meanings is definitively limited to a narrow class of documents to be processed. This method has the definitive paragraphs subjected, such as articles on an affair of terrorism ("who did attack what, where, when and how, the victims and demolished buildings are . . . "). A meaning template for each kind of affairs should be predefined. This method may be used only for articles on the same affair. However, it may not be applicable to a collection of documents gathered as the result of search or of clustering.

(3) The synthesis of following-up articles deals with the parent article and following articles of the same affair.

Therefore this method is not applicable to a group of documents gathered as the result of search or of clustering.

(4) The synthesis of a plurality of sentences is applicable only to the articles on the same affair. Therefore this method is not applicable to a group of documents gathered as the result of search or of clustering.

SUMMARY OF THE INVENTION

The present invention has been made in light of these problems, the present invention provides a document summarizing apparatus, which generates a comprehensive summary when processing a group of documents of relatively diverse contents.

Also, the present invention provides a document summarizing method, which in applicable to a group of documents of relatively diverse contents for generating a comprehensive summary therefrom.

In addition, the present invention provides a computer-readable recording medium carrying a document summarizing program, which may be used with a computer to generate a comprehensive summary about a group of documents of relatively diverse contents.

In order to solve the problems as described above, a document summarizing apparatus according to the present invention for generating a summary of a set of documents, comprises: a sentence analyzing unit that analyzes the syntax (structure) of sentences contained in the documents specified to be processed to generate an analysis graph describing the relational dependencies between words; an analysis graph scoring unit that scores the analysis graph generated by the sentence analyzing unit based on importance; an analysis graph score accumulating unit that stores the analysis graphs scared by said analysis graph scoring unit to combine the analysis graphs having the same concept to increase the scores given to the combined analysis graphs according to the combined contents; and a sentence synthesizing unit that selects graphs with higher scores from the group of analysis graphs stored in said analysis graph score accumulating unit when the analysis graphs have been generated from all specified documents to be processed and accumulated in said analysis graph score accumulating unit, in order to synthesize a summarizing sentence based on the selected analysis graphs.

In the document summarizing apparatus as disclosed in the present invention, once a plurality of documents are specified to be processed, the sentence analyzing unit analyses the syntax of sentences contained in each of specified documents to generate an analysis graph describing the relational dependencies between words. The analysis graph scoring unit then scores the generated analysis graphs based on importance. The scored analysis graphs will be stored in the analysis graph score accumulating unit. When storing graphs, the analysis graph score accumulating unit combines graphs having the same concept to accumulate the score given to the combined analysis graphs according to the combined contents.

In order to solve the problems as described above, a document summarizing method according to the present invention comprises the steps of: analyzing the syntax of sentences contained in the documents specified to be processed to generate an analysis graph describing the relational dependencies between words; scoring the analysis graph generated by the sentence analyzing unit based on importance; storing the scored analysis graphs to combine the analysis graphs having the same concept one with another; increasing the scores given to the combined analysis graphs according to the combined contents; synthesizing a summarizing sentence based on the selected analysis graphs by selecting graphs with higher scores from the group of stored analysis graphs when the analysis graphs have been generated and accumulated from all specified documents to be processed.

In the document summarizing method as disclosed in the present invention, when a plurality of documents are specified to be processed, analysis graphs will be generated from the sentences contained in the specified documents and a summary will be synthesized based on the analysis graphs with higher importance.

In order to solve the problems as described above, a computer-readable recording medium carrying a document summarizing program for generating by a computer a summary from a set of documents, according to the present invention, comprises a document summarizing program for use with a computer, including: a sentence analyzing unit that analyzes the syntax of sentences contained in the documents specified to be processed to generate an analysis graph describing the relational dependencies between words; an analysis graph scoring unit that scores the analysis graph generated by the sentence analyzing unit based on importance; an analysis graph score accumulating unit that stores the analysis graphs scored by said analysis graph scoring unit to combine the analysis graphs having the same concept to increase the scores given to the combined analysis graphs according to the combined contents; and a sentence synthesizing unit that selects graphs with higher scores from the group of analysis graphs stored in said analysis graph score accumulating unit when the analysis graphs have been generated from all specified documents to be processed and accumulated in said analysis graph score accumulating unit, in order to synthesize a summarizing sentence based on the selected analysis graphs.

The functions in a document summarizing apparatus according to the present invention can be configured on a computer running on a computer a document summarizing program carried on the recording medium as described above.

BRIEF DESCRIPTION OF THE DRAWINGS

Preferred embodiments of a document summarizing apparatus, a documents summarizing method and a recording medium carrying a documents summarizing program according to the present invention will be described in detail based on the drawings:

FIG. 6 is a schematic diagram illustrating a set of analytic trees including subtrees in a table form;

FIG. 7 is a schematic diagram illustrating a set of analytic trees with scores in a table form;

FIG. 8 is a schematic diagram illustrating a set of analytic trees accumulated in an analytic tree score accumulating unit in a table form;

FIG. 9 is a schematic diagram illustrating the sorted result of a set of analytic trees;

FIG. 16 is an example of a relational table;

FIG. 18 is an example of a relational table for the verbs;

FIG. 19 is an example of a relational table based on the natural language structure;

FIG. 20 is an example of document analyzed according to LFG;

FIG. 24 is a schematic diagram illustrating a pattern dictionary entry;

DETAILED DESCRIPTION OF THE PREFERRED EMBODIMENTS

The best mode for carrying out the present invention will be described in detail below, with reference to the accompanying drawings.

Figure 1:
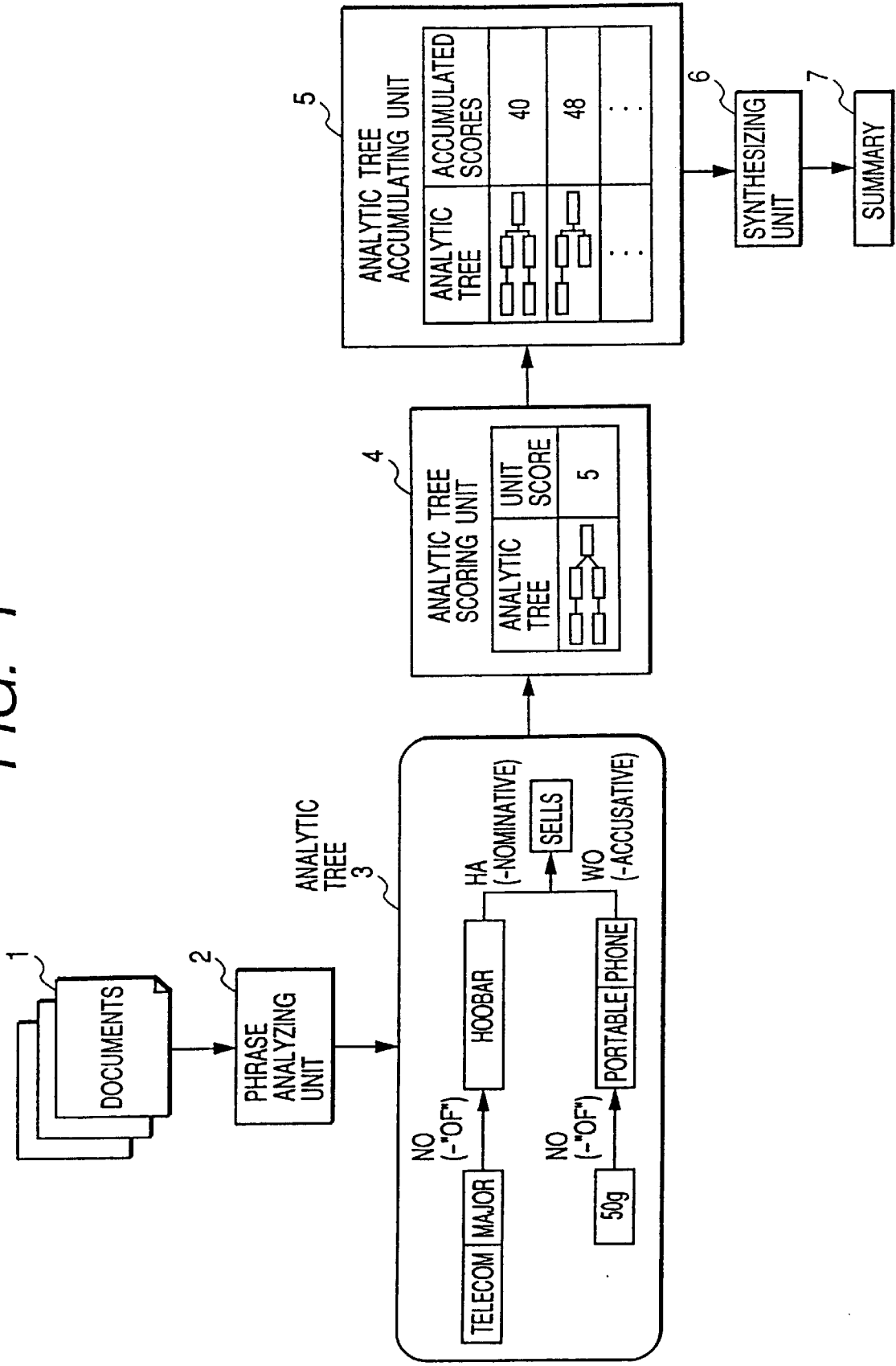
FIG. 1 is a block diagram illustrating the principle of the present invention.

Referring now to FIG. 1, there in shown a block diagram indicating the principle of the present invention. A document summarizing apparatus according to the present invention generates a summary from a set of documents. The documents 1 to be processed may be for example each document contained in a cluster of financial news articles over a given period of time, A sentence analyzing unit 2 analyzes the syntax of sentences contained in the documents 1 specified to be processed to generate an analytic tree 3, which is an analysis graph describing the relational dependencies between words of the sentence. An analytic tree scoring unit 4 scores the analytic tree 3 generated by the sentence analyzing unit 2 based on its importance. For example, a score corresponding to the number of elements will be given by assuming that an analytic tree has finer contents if it has more elements. An analytic tree score accumulating unit 5 accumulates the analytic tree that have been scored by the analytic tree scoring unit 4 to combine the analytic trees indicating the same concept to increase the scores given to a combined analytic tree according to the combined contents. The scores may be increased such that the total score of each of analytic trees to be combined becomes the score of combined tree.

Once an analytic tree from a set of all documents 1 specified to be processed has been generated and stored in the analytic tree score accumulating unit 5, a sentence synthesizing unit 6 selects the trees with higher scores from within a collection of trees accumulated in the analytic tree score accumulating unit 5, and synthesizes a summary 7 from the selected analytic trees.

When inputting information specifying documents 1 to be processed into the document summarizing apparatus as described above, the syntax of sentences contained in the specified documents 1 will be analyzed by the sentence analyzing unit 2, so that a analytic tree 3 describing the relational dependencies between words will be generated. The analytic tree 3 generated by the sentence analyzing unit 2 will be scored based on importance level by the analytic tree scoring unit 4. The analytic tree thus scored will be stored in the analytic tree score accumulating unit 5. When storing, the analytic trees having the same concept will be combined and the score given to the combined analytic trees will be increased according to the contents of combination. Analytic trees will be generated from all of the documents 1 specified to be processed, and stored in the analytic tree score accumulating unit 5. Thereafter trees with higher scores from a group of analytic trees stored in the analytic tree score accumulator unit 5 will be selected by the sentence synthesizing unit 6, and from the selected analytic trees a summary 7 will be synthesized.

The summary 7 as described above may be synthesis and enumeration of short sentences based on the concept shared by the plurality of documents. Accordingly if a summary of news articles over one year is created, a list of events frequently reported during that year may be obtained. There are fewer limitations of documents to be processed. In addition, as the summary in the form of sentences may be created, the summarized meaning will be significantly comprehensive when compared with the enumeration of keywords.

The conceptual identity can be confirmed from various points of view when generating analytic trees if a subtree is generated, which is a subgraph of analytic trees generated from one sentence. A first preferred embodiment of the present invention will be described below in detail, which has such characteristics.

Figure 2:
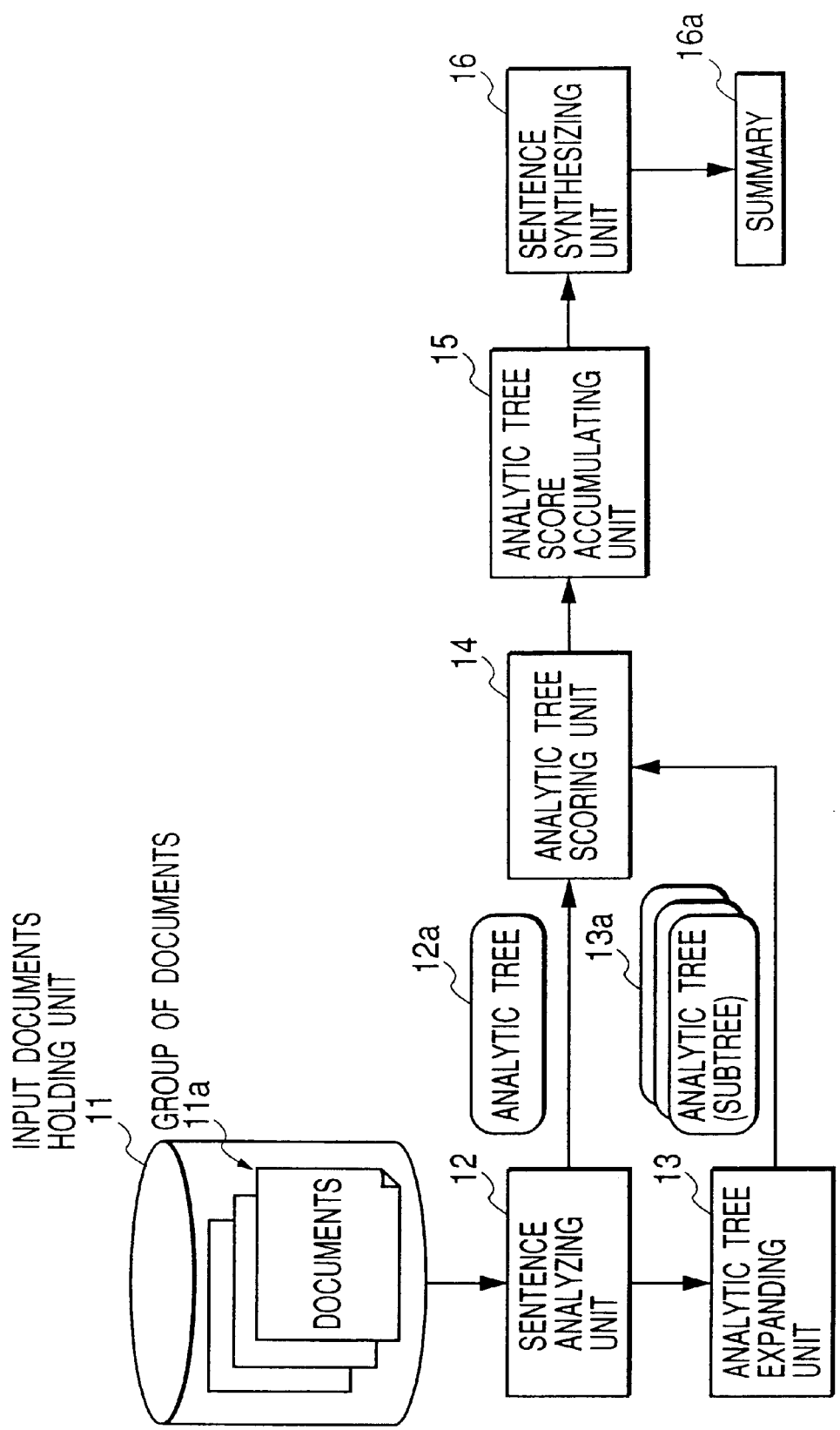
FIG. 2 is a block diagram illustrating first preferred embodiment of the present invention.

Referring now to FIG. 2, there is shown a block diagram illustrating first preferred embodiment of the present invention. The document summarizing apparatus of the first preferred embodiment of the present invention in comprised of an input documents holding unit 11, sentence analyzing unit 12, analytic tree expanding unit 13, analytic tree scoring unit 14, analytic tree score accumulating unit 15, and sentence synthesizing unit 16.

The input documents holding unit 11 may hold a group of documents 11a supplied to the document summarizing apparatus. The group of documents 11a is preferably a set of documents gathered under one certain contextual thread. For example, the group of documents 11a may be the results of search under a certain retrieval condition, or the results of classification (clustering) of a larger collection of documents.

The sentence analyzing unit 12 upon reception of a document summarizing command analyzes the syntax of sentences of the set of documents held in the input documents holding unit 11. There are well known methods for analyzing the syntax in the Prior Art. In general, the result of syntax analysis may be expressed as a tree structure. In the preferred embodiment, a syntax analysis system describing the dependency between words is adopted. The resulting analytic tree 12a will be passed to the analytic tree expanding unit 13 and analytic tree scoring unit 14.

The analytic tree expanding unit 13 extends the analytic tree 12a generated by the phrase analyzing unit 12 to generate respective analytic tree 13a for each of sentences contained in the analytic tree 12a. The analytic tree generated by extending an analytic tree is referred to as a "subtree" hereinbelow. The set of analytic trees 13a generated as subtrees will be passed to the analytic tree scoring unit 14. The subtrees will be generated down to the minimal unit carrying a conceptual meaning. The minimal unit of analytic tree may be comprised of two nodes and an arc connecting these nodes.

The analytic tree scoring unit 14 scores thus obtained analytic trees. In this description, the scores may be the number of elements (nodes) contained in an analytic tree. Other computational methods of score may be conceivable. For example, a score may be given by summing by altering weights according to the type of dependency, or by weighting the score of importance of words. When weighting according to the type of dependency, the structure of sentences are regarded first so as to reducing their leaves, such as essential case [4], other verbal qualifier [3], nominal qualifier [2], noun sequence [1].

The analytic tree score accumulating unit 15 stores the analytic trees scored by the analytic tree scoring unit 14. Each time the same analytic tree is appeared again, that tree will be merged to sum their respective scores to be merged.

The sentence synthesizing unit 16 selects the trees with higher scores from within the collection of analytic trees stored in the analytic tree score accumulating unit 15 to assemble a sentence therefrom. Then the unit synthesizes the sentences assembled from all selected analytic trees to synthesize a summary 16a.

In order to generate a summary in the document summarizing apparatus as described above, a group of documents 11a to be processed are stored in the input documents holding unit 11. Then the user of the document summarizing apparatus inputs a summary generating command to the document summarizing apparatus. The phrase analyzing unit 12 retrieves sequentially the documents stored in the input documents holding unit 11 one by one, and analyzes the syntax of the sentences contained in the retrieved documents to generate analytic tree 12a. Then, the analytic tree expanding unit 13 generates subtrees from the analytic tree 12a generated by the sentence analyzing unit 12. The analytic tree 12a generated by the sentence analyzing unit 12 and the analytic trees 13a generated as the subtrees by the analytic tree expanding unit 13 will be passed to the analytic tree scoring unit 14. These analytic trees will be scored in the analytic tree scoring unit 14. The analytic trees thus scored will be accumulated in the analytic tree score accumulating unit 15. When storing in the accumulator, if there already exists a same analytic tree, then these trees will be merged to accumulate their scores. This allows higher scores to be given to the common trees shared by a plurality of documents. Thereafter, the sentence synthesizing unit 16 selects the trees with higher scores to synthesize sentences therefrom. Thus synthesized sentences will be output as the summary 16a.

Figure 3:
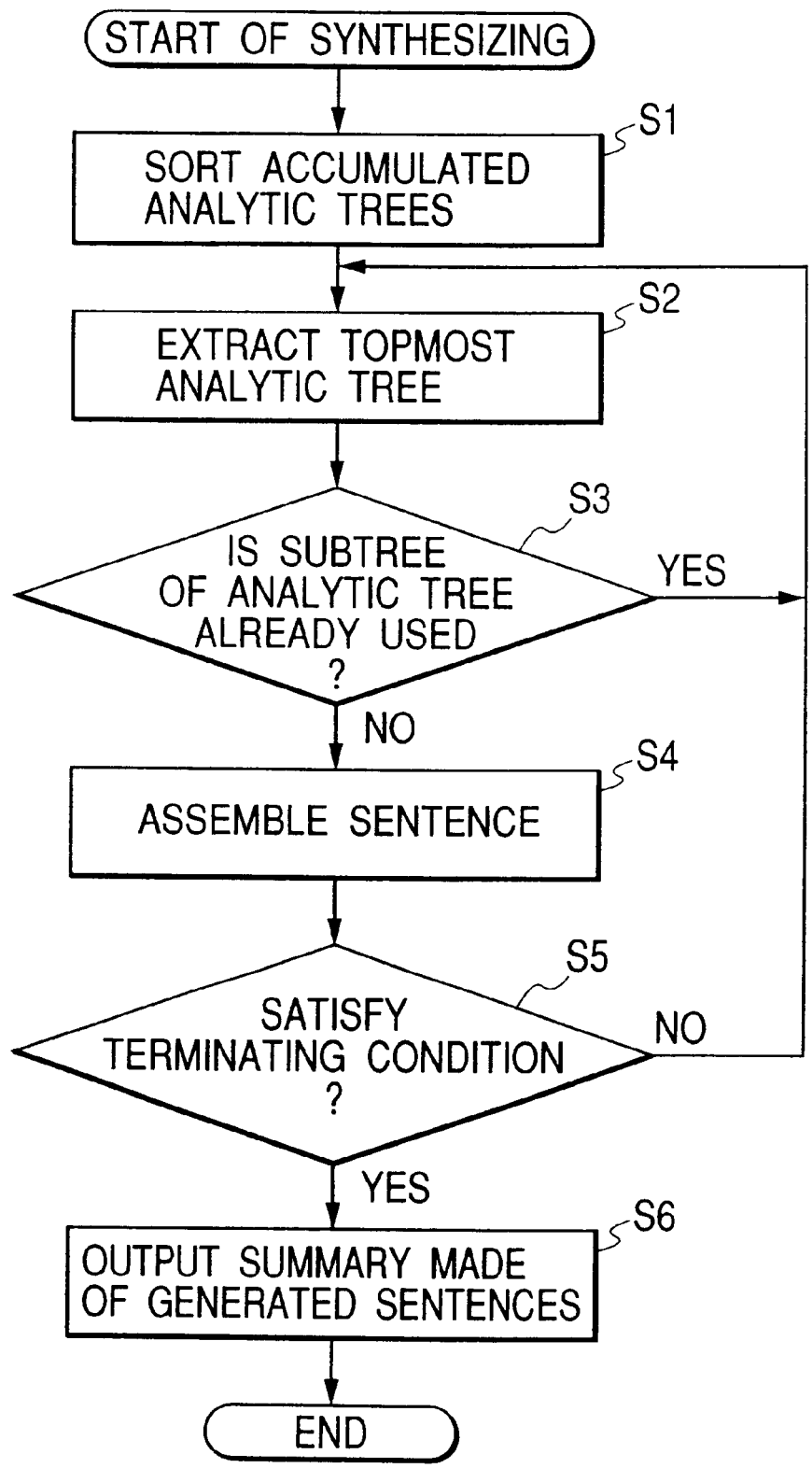
FIG. 3 is a flowchart illustrating the process of sentence synthesis according to the present invention.

Now referring to FIG. 3, there is shown a flowchart illustrating the process of sentence synthesis according to the present invention; this process may be done in the sentence synthesizing unit 16.

[S1] sorts in the order of higher score the analytic trees stored in the analytic tree score accumulating unit 15;

[S2] extracts the topmost analytic tree;

[S3] determines whether or not the extracted topmost tree is a subtree of analytic tree having a sentence assembled. If yes, then the process proceeds to step S2, otherwise to step S4;

[S4] assembles a sentence from the extracted tree

[S5] determines whether the process satisfies the termination condition. The termination condition is preselected as the number of analytic trees having sentence assembled, the number of characters of the assembled sentence, and so on. If yes then the process proceeds to step S6, otherwise to step S2;

[S6] outputs a summary made from the generated sentences.

In this manner, a summary 16a based on the group of documents 11a held in the input documents holding unit 11 will be generated.

An example of summarizing with the document summarizing apparatus of the first preferred embodiment will be more specifically described below. In the example below, it is assumed that the set of documents is constituted of "a collection of news articles gathered over a year under the subject of Hoobar, a telecom company".

The news articles concerning Hoobar are stored in the input documents holding unit 11. Then the user inputs a summarizing command. The articles on the Hoobar will be analyzed in the sentence analyzing unit 12 to generate the analytic tree.

Figure 4:
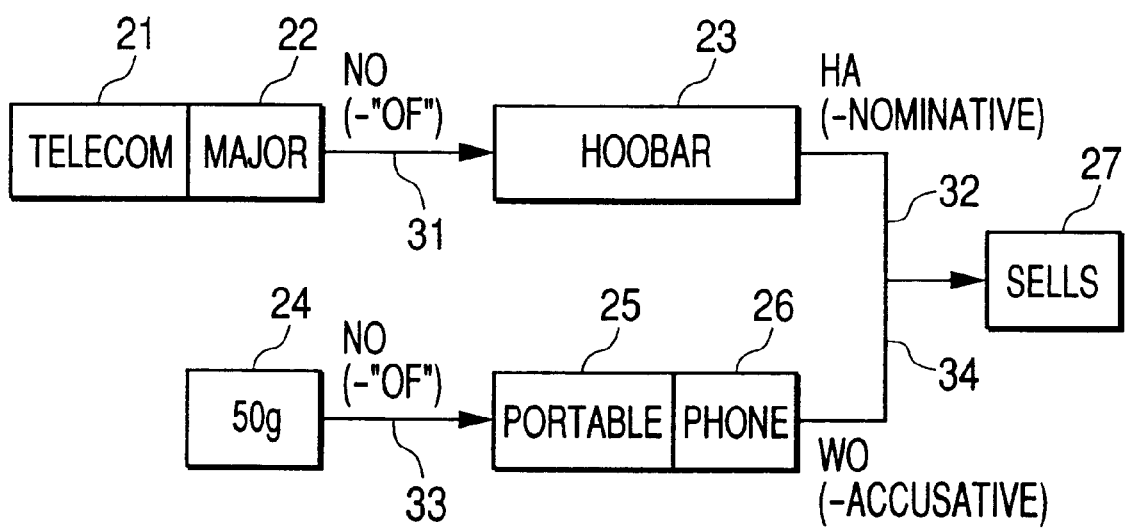
FIG. 4 is a schematic diagram illustrating an example of analytic tree.

Referring now to FIG. 4, there is shown a schematic diagram illustrating an example of analytic tree. This analytic tree may be obtained by analyzing the sentence "leading telecom firm Hoobar sells a 50 g portable phone to contemplate a backlash". In this example, nodes 21 to 27 designate independent words, the arcs 31 to 34 designate to the relational dependencies therebetween. Since surface cases are used as relational dependency, case adjuncts are labeled as they are. For a compound sentence, connected by a coordinate conjunction, each simple elementary sentence constituting the compound sentence will be analyzed.

The analytic tree of this type may be expressed as a table.

Figure 5:
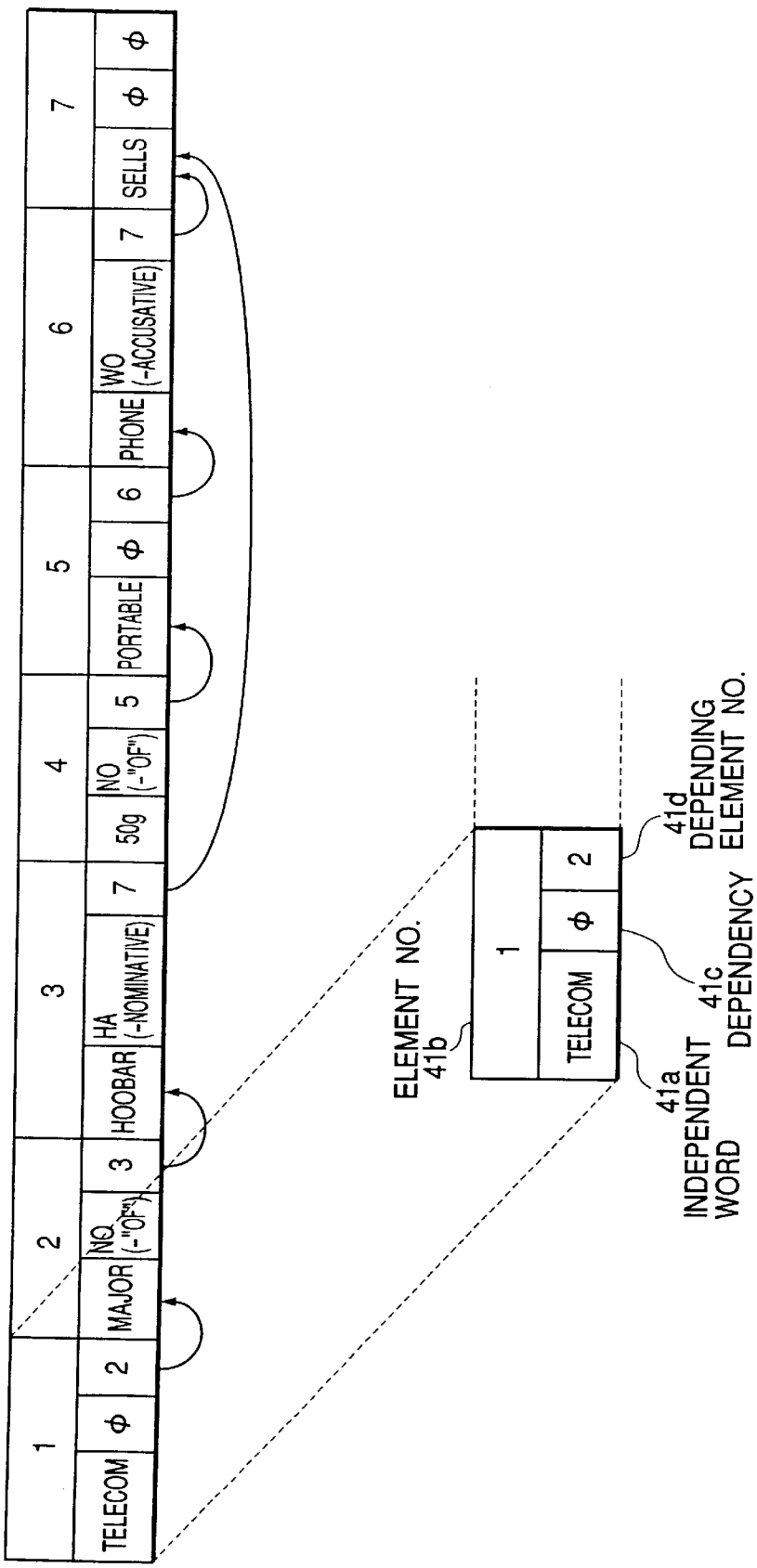
FIG. 5 is a schematic diagram illustrating an example of analytic tree in a table form.

Now referring to FIG. 5, there is shown a schematic diagram illustrating an example of analytic tree in a table form. In the analytic tree in a table form 41, there are registered element numbers 41b, relation 41c, and element numbers of dependency 41d corresponding to each of words 41a. For the sake of simplicity, words, relations and dependencies are described for each word in this example: however, other information (such as word classes, conjugation, and pointers to the conceptual description) may be incorporated. It should be noted that the relation [φ] indicates that a word is directly connected to its depending word.

Once the analytic tree as shown in FIG. 5 is generated, the analytic tree expanding unit 13 extends the tree to generate subtrees. The subtrees may also be described as analytic trees in table form.

Now referring to FIG. 6, there is shown a schematic diagram illustrating a set of analytic trees including subtrees in a table form. The set of analytic trees 40 is described as the word and relation, with depending words omitted for simplifying the drawing. In the drawing [φ] cells designate to absence of corresponding element. The first column is an analytic tree 41 to be extended. Beginning from the second column, subtrees are shown, which are analytic trees 42a to 42j generated by extending the analytic tree 41. The set of analytic trees 40 will be passed to the analytic tree scoring unit 14, which in turn will scores each of analytic trees 41, 42a to 42j within the set of analytic trees 40.

Now referring to FIG. 7, there is shown a schematic diagram illustrating a set of analytic trees with scores in a table form. In this example, as the numbers of elements in the trees are used for scores, the score of the first tree 41 is the highest, [7]. The lesser the number of elements, the lower the score.

The scored tree will be stored in the analytic tree score accumulating unit 15. The process as described above will be performed for all the documents stored in the input documents holding unit 11 to store in the analytic tree score accumulating unit 15 one by one. At the time when a tree is input, the analytic tree score accumulating unit 15 determines whether or not there is a tree having the same structure as the incoming tree to be stored in the unit. If there is already a tree of the same structure, then the unit merges the trees to add the score of the incoming tree to be stored to the score of the existent tree.

Now referring to FIG. 8, there is shown a schematic diagram illustrating a set of analytic trees accumulated in an analytic tree score accumulating unit in a table form. In the analytic tree score accumulating unit 15, information in the items "score" "number of elements" and "number of occurrences" is added to the trees 43a to 43i in the set of analytic trees 43 in the table form. Here the "score" is the score accumulated to that tree. The "number of elements" is the number of elements (words) in the tree. The "number of occurrences" indicates how many times the same trees have appeared.

The score value accumulated in the analytic tree score accumulating unit 15 may be given as:

(scare of tree)×(number of occurrences of the tree)

When the analytic trees and their subtrees have been generated from the documents stored in the input documents holding unit 11 and stored in the analytic tree score accumulating unit 15, the sentence synthesizing unit 16 will sort by the score these trees accumulated in the analytic tree score accumulating unit 15.

Now referring to FIG. 9, there is shown a schematic diagram illustrating the sorted result of a set of analytic trees. The trees 43a to 43i of the set of trees 43 shown in FIG. 8 are listed in the order of their scores. The sentence synthesizing unit 16 will pick up the topmost relational dependency among the sorted trees to assemble a sentence from thus picked-up trees.

Figures 10, 11:
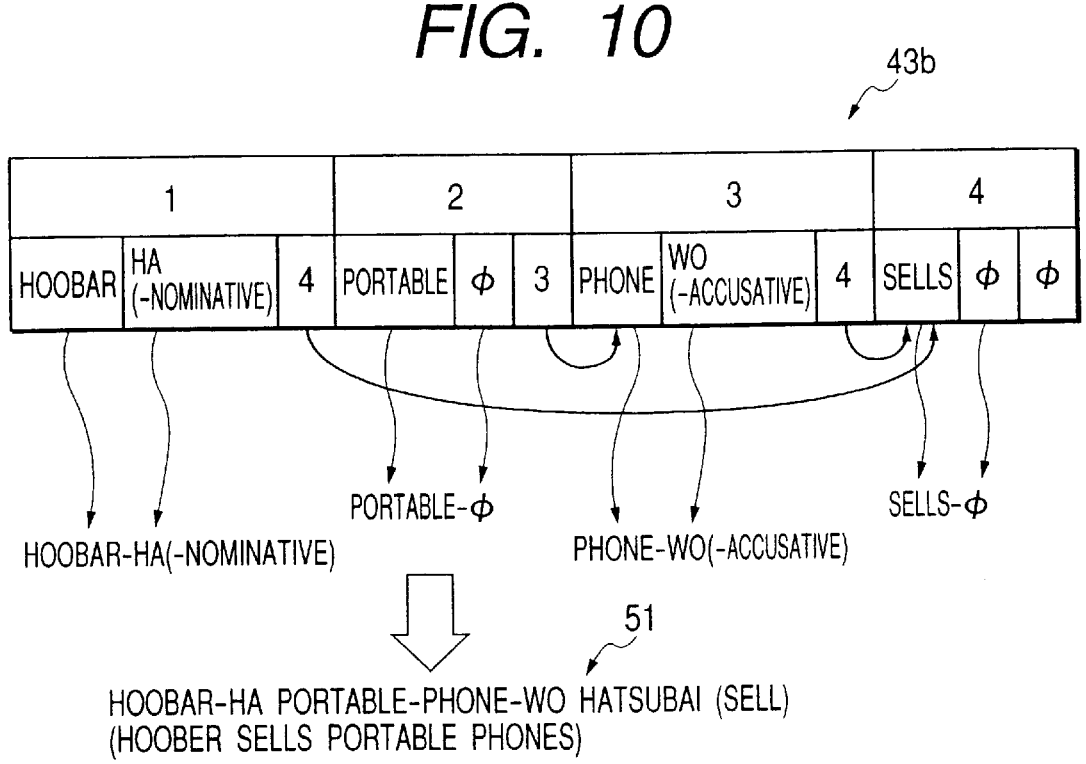
FIG. 10 is a schematic diagram illustrating the generation of a summary from the analytic tree.
FIG. 11 is a schematic diagram illustrating an example of summary.

Now referring to FIG. 10, there is shown a schematic diagram illustrating the generation of a summary from the analytic tree. This is an example of generating a summary 51 from the first tree 43b shown in FIG. 9. In this example, the words are picked up by their order described in the record of the tree 43b, to convert the relational dependency into the adjunct (the relation corresponds to the adjunct in this case) to add to the word of the record. Then the summary 51 will be generated by connecting these phrases.

From the first tree 43b,

"Hoobar portable phone sell"

"Hoobar-wa portable-phone-o[-accusative]hatsubai (Sell)"

(Hoobar portable phone sell) may be obtained. In this case the verb may be conjugated to as terminative. After conversion to the terminative, the sentence above will be "Hoobar sells portable phone".

"Hoobar-wa portable-phone-o hatsubai(Sell)-suru" (Hoobar sells portable phone)

The sentence synthesizing unit 16 will select second topmost to iteratively generate another sentence. In the sentence synthesizing unit 16, if a selected tree is a subtree of an analytic tree already selected to generate a sentence, this tree will be omitted. Otherwise, if a subtree of a selected analytic tree is in the selected and generated tree, then this tree will not be omitted. In FIG. 9, the third tree 43c is a subtree of first analytic tree 43b, matching to the former criteria, therefore no sentence will be generated.

From second tree 42e, a sentence "Hoobar-wa Simon-City-History-Art-Museum-wo shien (support)" will be generated. The third analytic tree 43c will be omitted. From the fourth tree 43g, a sentence "Hoobar-wa satellite portable phone-wo kenkyuu(study)" will be generated. The fifth tree 43h will be omitted because this is a subtree of the fourth 43g. With respect to the sixth tree 43a, the first tree 43b is its subtree. This matches to the latter criteria of omission so that the sixth tree will not be omitted to generate a summary. Then a sentence will be generated as "Hoobar 50 g portable phone sell".

The condition for terminating iteration is determined by whether or not a predefined number of sentences have been selected, or whether the total length of sentences synthesized exceeds the preselected length. In this case the former condition is used to select topmost three sentences.

Now referring to FIG. 11, there is shown a schematic diagram illustrating an example of summary. In this example, the summary 60 of the activity of Hoobar of this year may be obtained as "Hoobar sells portable phone; Hoobar supports Simon City History Art Museum; Hoobar studies satellite portable phone". The summary 60 will be displayed on the screen of the apparatus used by the user. Accordingly, the user is allowed to browse and review summaries of a plurality of documents.

When releasing the condition of termination to generate a summary by selecting four sentence-records, another sentence "Hoobar sells 50 g portable phone" will be appended.

In the description as above, subtrees may be generated by extending the analytic tree immediately after the tree has been generated by the sentence analyzing unit 12. The manner of generation of subtrees as described above may be performed after scoring in the analytic tree scoring unit 14. In this manner, the analytic tree expanding unit 13 receives the trees scored by the analytic tree scoring unit 14 to generate subtrees therefrom. Subtrees thus generated will be passed to the analytic tree scoring unit 14, which in turn will scores the received subtrees.

Although the conjugation of case endings is not included in the tree in this example, the conjugation may be incorporated in the tree such that each of conjugated patterns may be aggregated. For example, "hatubai-suru(sell)", "sold", "selling" can be independently aggregated.

Now second preferred embodiment of the present invention will be described in detail below. In second preferred embodiment the importance score of words are used. Here each of words will not only be scored but also the importance level of the words contained in the analytic trees extracted as summary may be decreased to re-score the trees each time a summary is generated.

Figure 12:
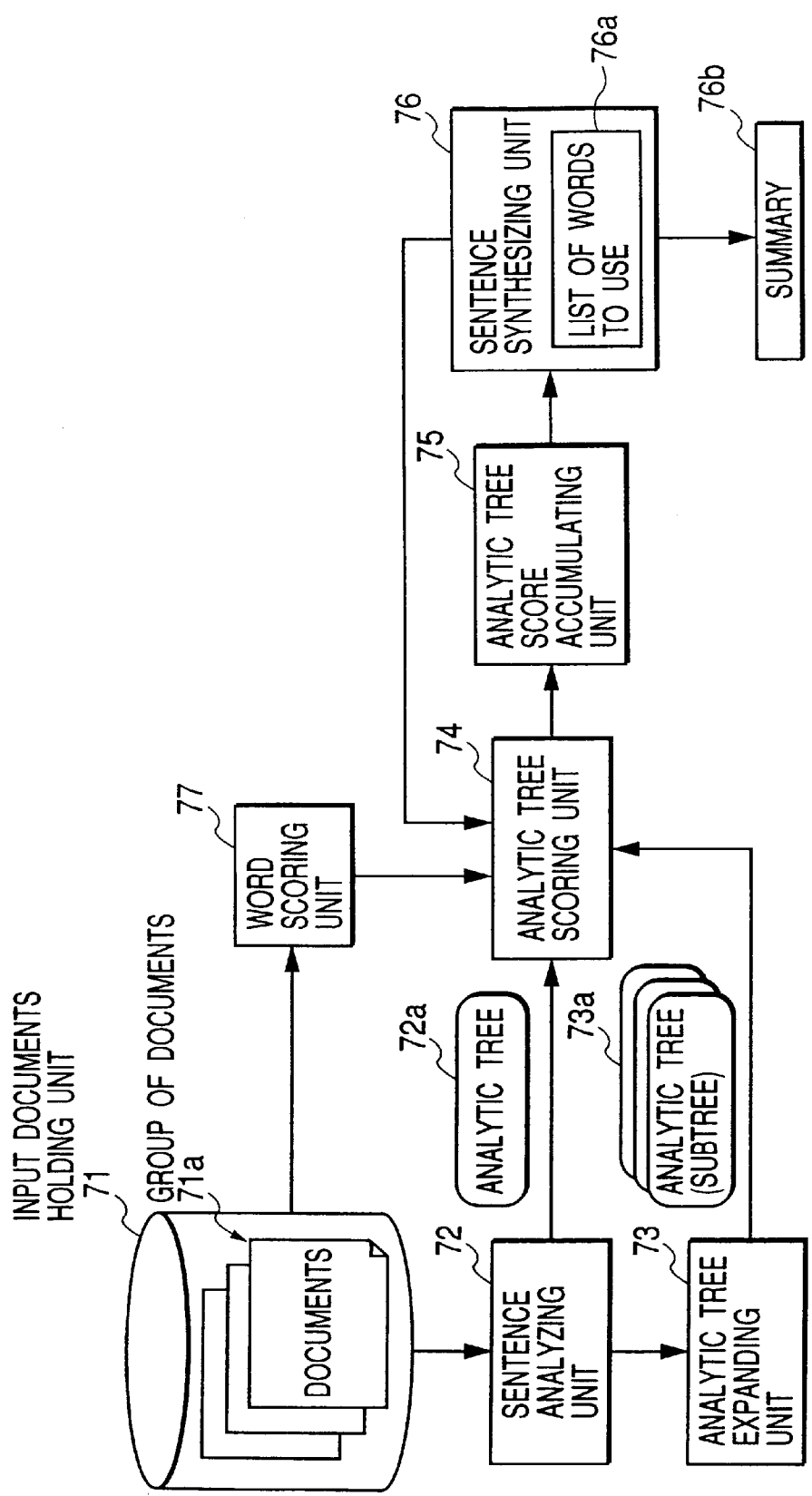
FIG. 12 is a block diagram illustrating second preferred embodiment according to the present invention.

Now referring to FIG. 12, there is shown a block diagram illustrating second preferred embodiment according to the present invention. The document summarizing apparatus of second preferred embodiment comprises an input documents holding unit 71, sentence analyzing unit 72, analytic tree expanding unit 73, analytic tree scoring unit 74, analytic tree score accumulating unit 75, sentence synthesizing unit 76, and word scoring unit 77. Since the input documents holding unit 71, sentence analyzing unit 72, analytic tree expanding unit 73, and analytic tree score accumulating unit 75 have the similar functionality to the elementary units in first preferred embodiment as shown in FIG. 2, further description of these units are omitted. Briefly, the process up to generating the analytic tree 72a and the group of analytic trees 73a that are the subtrees thereof from the group of documents 71a are identical to first preferred embodiment.

The word scoring unit 77 calculates the importance score of words contained in each documents of the group of documents 71a held in the input documents holding unit 71. The tf*IDF product (tf: term frequency. IDF: inverse document frequency) is used for the calculation of scores.

The analytic tree scoring unit 74 uses the importance score of words calculated by the word scoring unit 77 to calculate the score of analytic tree. The calculation of scores used in the analytic tree scaring unit 74 used in this preferred embodiment is the applied sum by altering the weights based an the type of relational dependencies, however the calculation may be simply the algebraic sum of scores of words appeared in the analytic trees. The score of a respective word is weighing according to their type of relational dependency to accumulate. The weighting depends on the essential case [4], other verbal qualifier [3], nominal qualifier [2] and nominal sentence [1] as well as final depended item [4]. The essential case in this description designates to the class word required by a verb.

For the score of an analytic tree, (the importance score)× (weight by the relational dependency type) will be calculated for each of words. The sum of calculated values will be the score of that analytic tree. The analytic tree thus scored will be stored in the analytic tree score accumulating unit 75, as similar to first preferred embodiment.

The analytic tree scoring unit 74 re-scores the analytic trees stored in the analytic tree score accumulating unit 75 in response to the re-scoring request from the sentence synthesizing unit 76. In this case the importance score will be decreased by a predefined rate for each words held in the word list 76a. The score of analytic trees stored in the analytic tree score accumulating unit 75 will be calculated by using new score of word importance level.

The sentence synthesizing unit 76 synthesizes sentences after the generation of analytic trees and the scoring thereof for all the input documents. In the sentence synthesizing process, the analytic trees stored in the analytic tree score accumulating unit 75 will be sorted by their score. Then the topmost tree among the group of sorted trees will be picked up to be eliminated from the analytic tree score accumulating unit 75. Then the words used will be stored in the word list 76a. The sentence synthesizing unit 76 will check the condition of termination. If the process does not terminate, then the unit will output the re-scoring request to the analytic tree scoring unit 74. When the re-scoring finishes, the analytic trees in the analytic tree score accumulating unit 75 will be sorted and the topmost will be again picked up.

In accordance with the document summarizing apparatus as described above, the sentence analyzing unit 72 analyses the documents stored in the input documents holding unit 71 to generate the analytic tree 72a. From these analytic tree 72a, the analytic tree expanding unit 73 further generates the group of analytic trees 73a which are subtrees, then the trees and subtrees together are sent to analytic tree scoring unit 74. The word scoring unit 77 calculates the importance score of words used in the documents stored in the input documents holding unit 71. The importance score of each of words is sent to the analytic tree scoring unit 74. The analytic tree scoring unit 74 uses the importance score of words to calculate the score of the analytic trees supplied from the sentence analyzing unit 72 and analytic tree expanding unit 73, and passes the scored trees to the analytic tree score accumulating unit 75, which in turn stores the incoming trees and merges the identical trees to accumulate their scores.

When the analytic trees generated from all of the documents in the input documents holding unit 71 are stored in the analytic tree score accumulating unit 75, the sentence synthesizing unit 76 sorts the trees in the order of scores. Then the synthesizing unit 76 picks up the topmost tree to assemble a sentence, and stores the words contained in the tree in the word list 76a. The picked-up tree will be eliminated from the analytic tree score accumulating unit 75. At this point, if the terminating condition preset to the sentence synthesizing unit 76 in not satisfied, the sentence synthesizing unit 76 will send a re-scoring request to the analytic tree scoring unit 74. The information on the words immediately added to the word list 76a will be passed to the analytic tree scoring unit 74, which unit in turn, in response to reception of the re-scoring request, will decrease, for example divided by five, the importance score of words immediately added to the word list 76a. The updated importance score of words will be used for calculating the score of analytic trees stored in the analytic tree score accumulating unit 75 to add the resulting score to the corresponding tree in the analytic tree score accumulating unit 75.

The process proceeds as similar to the preceding embodiment until the terminating condition in the sentence synthesizing unit 76 will be satisfied. When the terminating condition is met, a summary 76b will be generated and output based on the sentences that have been made at this point.

By calculating the score of trees with the importance level of words and type of relational dependencies being considered, more important sentences in a plurality of documents may obtain higher score. More accurate summary may be retrieved accordingly. In addition, the re-scoring of analytic trees each time when picking up important sentences allows similar contents to be prevented from being selected. Re-scoring appropriately applied may eliminate the needs of comparing for determining whether or not a subtree is of an analytic tree already summarized at the time of picking up the relational dependency.

A third preferred embodiment according to present invention will be described in detail below. This third preferred embodiment uses a thesaurus to the conversion of analytic trees.

Figure 13:
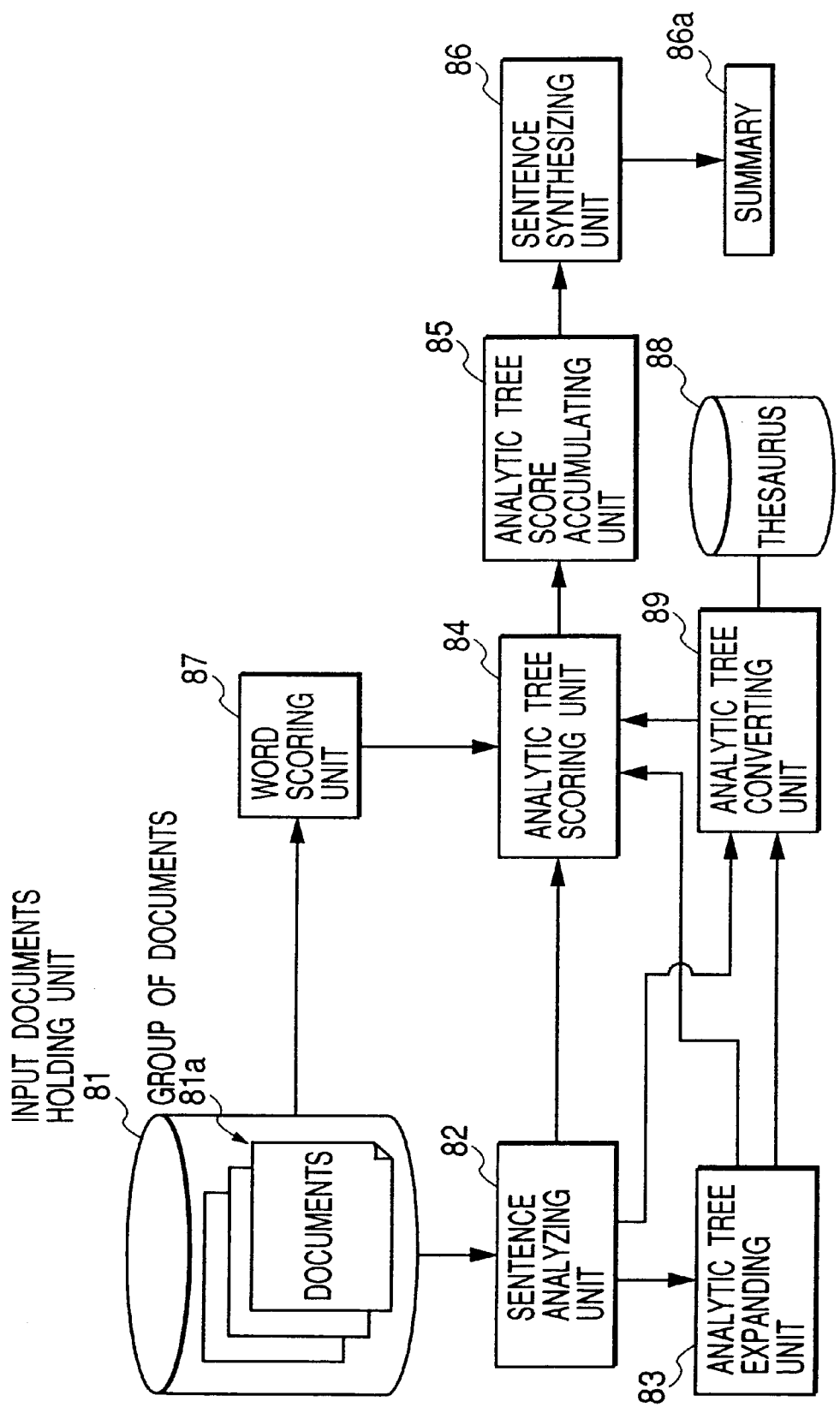
FIG. 13 is a block diagram illustrating third preferred embodiment according to the present invention.

Now referring to FIG. 13, there is shown a block diagram illustrating the third preferred embodiment according to the present invention. The document summarizing apparatus of third preferred embodiment comprises an input documents holding unit 81, sentence analyzing unit 82, analytic tree expanding unit 83, analytic tree scoring unit 84, analytic tree score accumulating unit 85, sentence synthesizing unit 86, word scoring unit 87, thesaurus 88, and tree translating unit 89. The input documents holding unit 81, analyzing unit 82, analytic tree expanding unit 83, analytic tree score accumulating unit 85, sentence synthesizing unit 86, and word scoring unit 87 have the same functionality as the elements in second preferred embodiment shown in FIG. 12 and will not be further described.

The thesaurus 88 comprises the hierarchical containment of the meaning between words to translate input words. It performs synonym translation and conversion to the concept in upper class but does not the conversion to lover class word. More specifically, when a word is input, it returns a list of pair of its upper class word and the number that indicates what upper level the word was converted to (translation level) Translation level is 1 when translating to a synonym. Translation to upper class can be limited. In the example below, translation to upper class is limited to three levels.

For example, words "Hoobar" "sell" "phone" "ART MUSEUM" are input into the thesaurus, following results may be returned:

Hoobar: (Hoobar:1, telecom manufacturer:1, manufacturer:2, company:3)

sell; (vend:1, sale:1, trade:1, business:1, transaction 2)

phone: (telecom:1, electric appliance:2, device 3)

Art Museum: (painting:1, art:1, culture:2).

The tree translating unit 89 receives the analytic trees generated by the analyzing unit 82 and the trees generated as subtrees by the analytic tree expanding unit 83 to supply sequentially to the thesaurus 88 words constituting these trees, then the unit replaces words in the trees to be processed with the words replied by the thesaurus 88. The unit adds the translation levels of the words and passes to the analytic tree scoring unit 84.

The analytic tree scoring unit 84 considers the total of importance scores of the word constituting the trees as the score of trees for the analytic trees directly received from the analyzing unit 82. The unit 84 converts a score lower than that in the original trees in response to the translation level for the analytic trees received from the tree translating unit 89. In this example the score is decreased by multiplying the score Sw of word importance by the degression rate R (0<R<1). A score is given by $$Sw \times R \times L$$

where L is the translation level. In the example above, if the degression rate R is 0.5, the importance score Sw of "Hoobar" will be multiplied by:

Hoobar: 0.5 telecom manufacturer: 0.5 manufacturer: 0.25 and company: 0.125, respectively.

By calculating as described above, when scores in analytic trees are low, if the scores are translated to upper class concept, the scores from a plurality of trees will be accumulated by the analytic tree score accumulating unit to increase the total score to become a candidate of word in the summary. Such an example will be indicated below. It should be noted that for the sake of simplifying the effect obtained by the preferred embodiment, the importance score of words will not be considered (or the importance level of all words will be "1").

Figure 14:
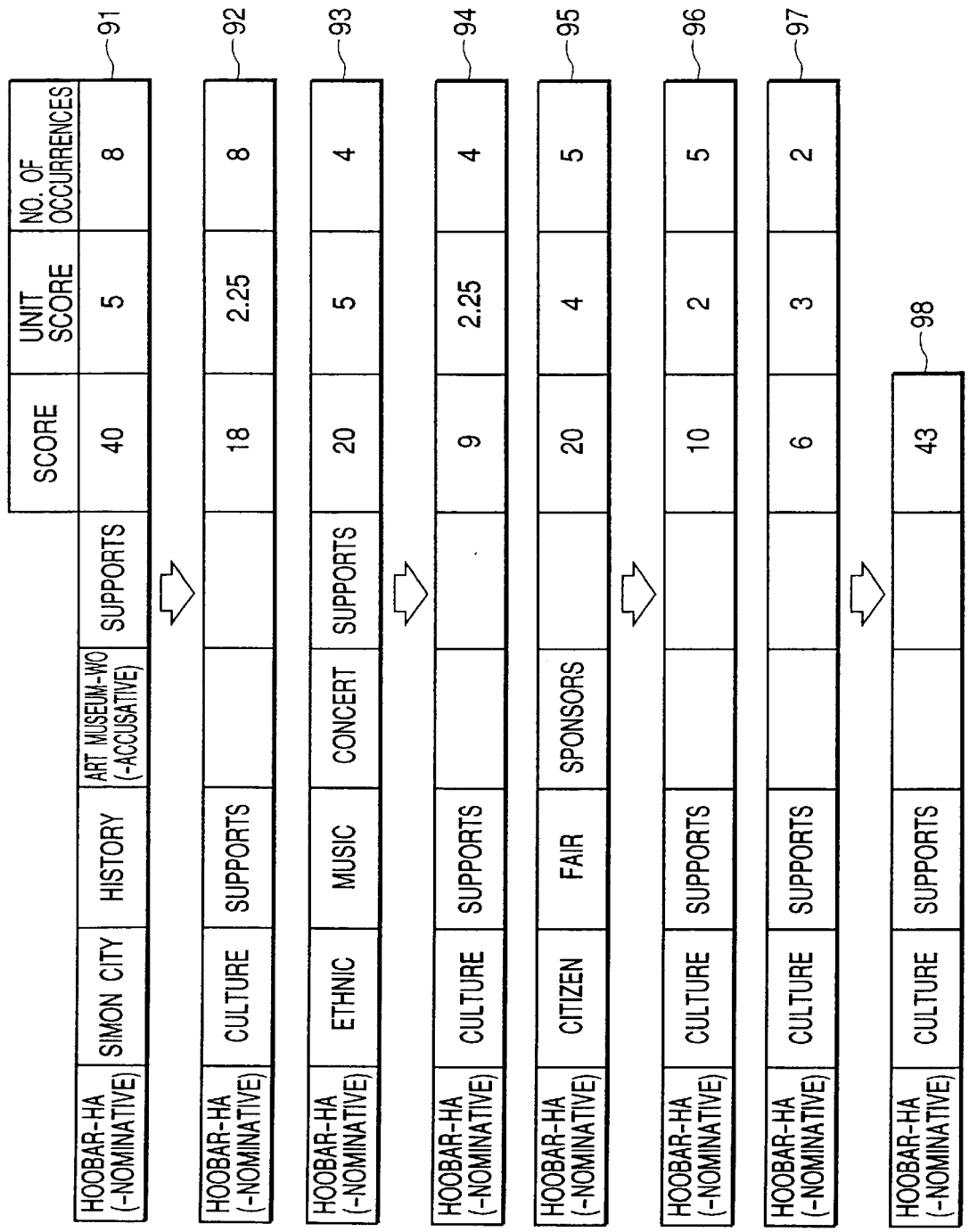
FIG. 14 is a schematic diagram illustrating the scoring of an analytic tree translated by a thesaurus.

Now referring to FIG. 14, there is shown a schematic diagram illustrating the scoring of an analytic tree translated by a thesaurus. In an analytic tree 91 "Hoobar supports Simon City History Art Museum", the output of "Art Museum" from the thesaurus will be:

Art Museum: (painting:1, art:1, culture:2)

The scores of respective elements will be:

painting: 0.5 art: 0.5 culture: 0.25

The unit score of the analytic tree expanded by the thesaurus will be:

"Hoobar supports painting": 1+0.5+1=2.5

"Hoobar supports art": 1+0.5+1=2.5

"Hoobar supports culture": 1+0.25+1=2.25

For the analytic tree 92 "Hoobar supports culture", total score by multiplying the number of times of occurrence "8" will be 18.

Similarly, in the analytic tree 93 "Hoobar supports ethnic music concerts", "ethnic music concerts" will be translated to "culture" with the score of 0.25. This results in the analytic tree 94 "Hoobar supports culture" with the unit score=1+0.25+1=2.25. By multiplying this score with the number of times of occurrence "4" final score "9" will be obtained.

In the analytic tree 95 "Hoobar supports citizen fair", "citizen fair" will be translated to "culture" with the score of 0.5, "support" will be translated to "push" with the score 0.5. This results in the analytic tree 96 "Hoobar SPONSORS culture", with the unit score of 1+0.5+0.5=2. By multiplying this with the number of times of occurrence "5" final score "10" will be obtained.

The analytic tree "Hoobar supports Asian culture" may derive to a subtree, the analytic tree 97 "Hoobar supports culture". The unit score in this tree will be the same, and score "6" will be added to the total score.

The score after merging "Hoobar supports culture" then will be "43", which is higher than the score "40" of "Hoobar supports Simon City History Art Museum". When not considering scores of other subtrees that may exist, the score "43" will be held on in upper rank, resulting in a summary "Hoobar supports culture".

Fourth analytic tree shown in FIG. 8, tree 43d "Hoobar supports ethnic music concerts", and the ninth analytic tree, the tree 43i "Hoobar sponsors citizen fair" are not direct candidates, however by the analytic tree translation with the thesaurus 88, the upper class concept of these trees will be included in the summary.

By adjusting the degression rate to a smaller value than that used to be here, more specific meanings (more concrete meanings) may be held in the summary. For example, if the degression rate is 0.3, the scores of analytic trees shown in FIG. 14 will be as follows:

The analytic tree 92 "Hoobar supports culture" resulted from "Hoobar supports Simon City History Art Museum" has unit score of "1+0.09+1=2.09", yielding a total accumulated score of "2.09×8=16.72".

The analytic tree 94 "Hoobar supports culture" resulted from "Hoobar supports ethnic music concerts" has unit score of "1+0.09+1=2.09", yielding a total accumulated score of "2.09×4=8.36".

The analytic tree 96 "Hoobar supports culture" resulted from "Hoobar sponsors citizen fair" has unit score of "1+0.3+0.3=1.6", yielding a total accumulated score of "1.6×5=8.0".

The analytic tree 97 "Hoobar supports Asian culture" that is a subtree of "Hoobar supports Asian culture" has the same score, yielding "3×2=6".

The total score of "Hoobar supports Asian culture" becomes 39.08, which is smaller than the score "40" of "Hoobar supports Simon City History Art Museum". Then the tree "Hoobar supports Simon City History Art Museum", which has more specific contents, will be selected prior to "Hoobar supports culture".

In the third preferred embodiment, when translating a word into its upper class concept, the score of analytic tree will be decreased by decreasing the score of the word. However, the score of an analytic tree may be directly decreased. For example, each time a word is translated to its upper class concept, the score for the analytic tree containing that word can be decreased by one-half.

Now a fourth preferred embodiment according to present invention will be described below in detail. The fourth embodiment merges the trees having similar meaning if not identical, when accumulating the analytic trees.

Figure 15:
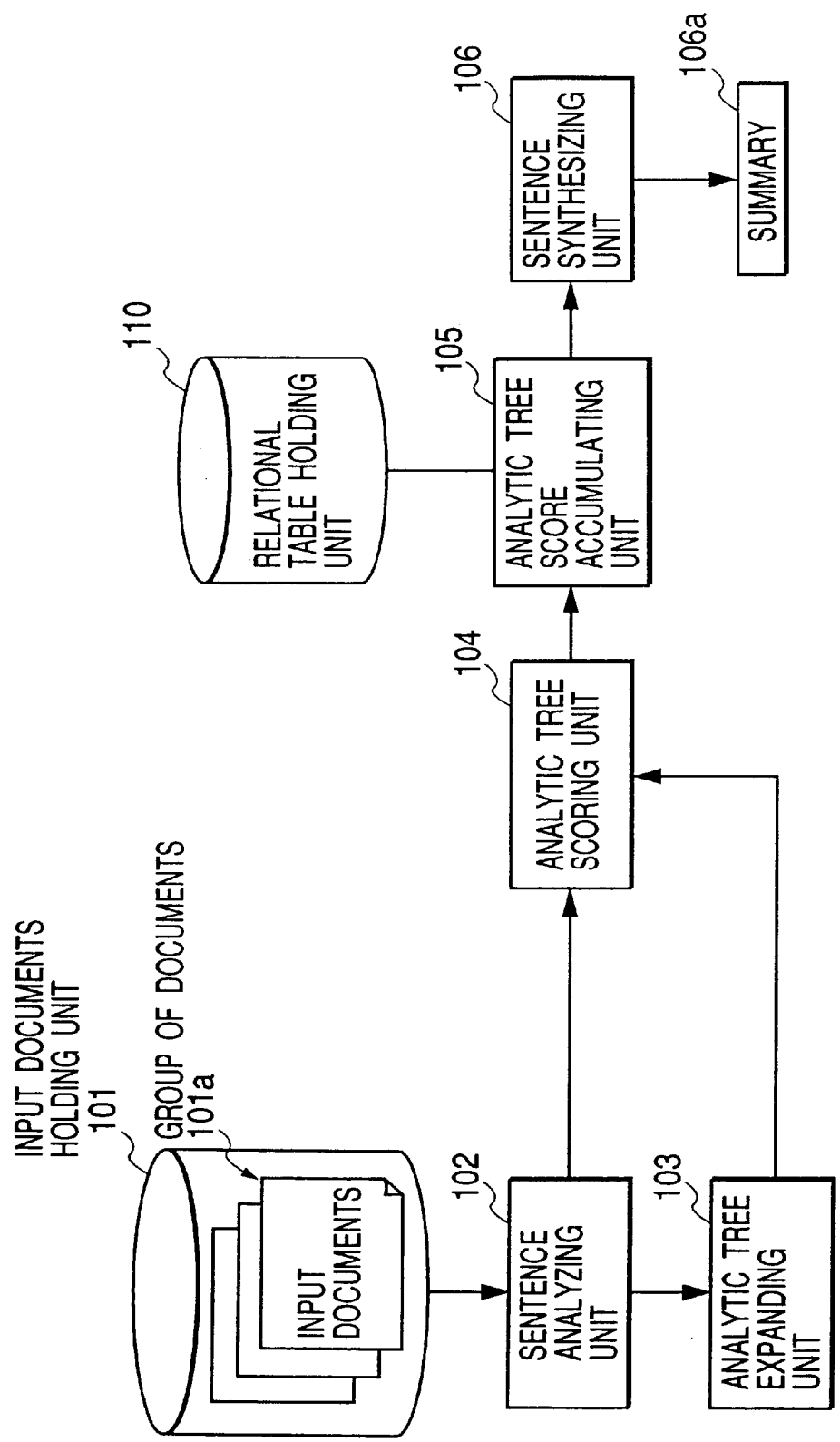
FIG. 15 is a block diagram illustrating fourth preferred embodiment according to the present invention.

Now referring to FIG. 15, there is shown a block diagram illustrating the fourth preferred embodiment according to the present invention. The fourth preferred embodiment comprises a input documents holding unit 101, sentence analyzing unit 102, analytic tree expanding unit 103, analytic tree scoring unit 104, analytic tree score accumulating unit 105, sentence synthesizing unit 106, and relational table holding unit 110. The input documents holding unit 101, sentence analyzing unit 102, analytic tree expanding unit 103, analytic tree scoring unit 104, and sentence synthesizing unit 106 have the identical function to the similar elements in first preferred embodiment as shown in FIG. 2, further specific description thereof will be omitted. Briefly, the process from the generation of analytic tree 102a and subtrees or the group of trees 103a from the group of documents 101a through the scoring of analytic trees is identical to the process described in first preferred embodiment. The process of synthesizing a summary 106 a from the analytic trees stored in the analytic tree score accumulating unit 105 also is identical thereto.

The relational table holding unit 110 holds as a relational table the rules of translation of the relational dependencies that may result in some similar meanings when replacing the adjunct ("HA-NOMINATIVE" or "GA-NOMINATIVE") between words in accordance with given rules.

The analytic tree score accumulating unit 105 translates the relational dependency in the stored analytic trees based on the relational table to determine which trees make a pair of same analytic trees. The unit decreases the score of one analytic tree according to the translation strategy before adding to the score of another analytic tree. More specifically, if there is a pair of trees that have the same nodes indicating words and different arcs indicating relational dependencies between words, the unit determines the similarity between the arcs by using the relational table. If it is determined to have similarity, the unit will translate the relational dependencies therebetween to merge to the analytic tree of similar meaning. The score will be added to the analytic tree of similar meaning by decreasing the original score of the tree to be merged.

The translation process of relational dependencies by using the relational table will be described in detail below.

Now referring to FIG. 16, there is shown an example of a relational table. The relational table 111 is comprised of tags and candidates of translation. A "tag" is set to be the relational dependency to be translated. A "candidate" is in this example defined as a pair of "dependency" and "digression rate". For example, it is indicated that the relational dependency of adjunct "GA-NOMINATIVE" may be translated to the relational dependency of adjunct "HA-NOMINATIVE", and that the score may be rated to 0.5 when translating. The degression rate for each of candidates in indicated here but it is conceivable that only the sequence of relational dependencies may be recorded with a predetermined fixed degression rate.

Figure 17:
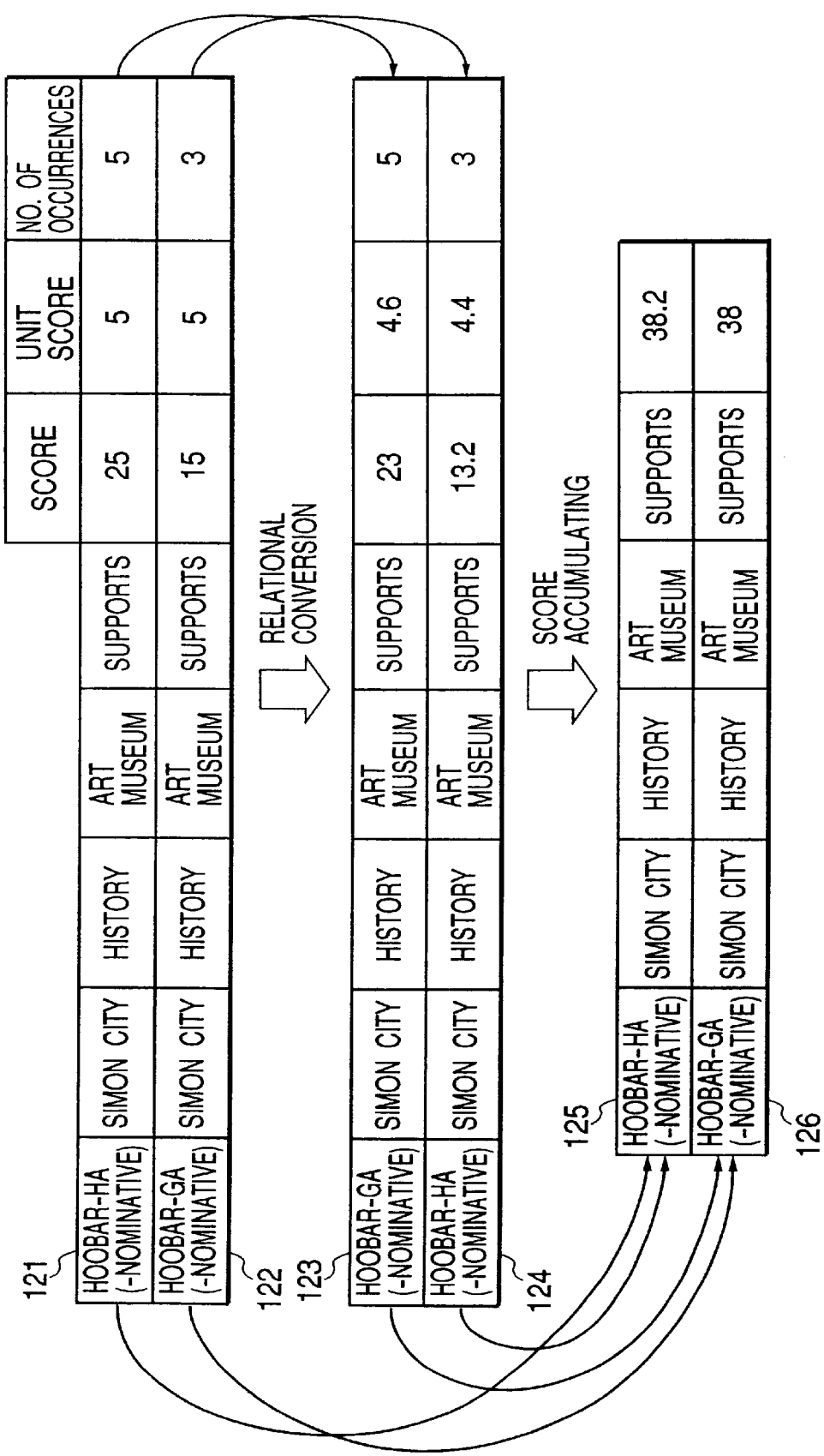
FIG. 17 is an example of relational dependency translation.

Now referring to FIG. 17, there is shown an example of relational dependency translation. In the analytic tree score accumulating unit 105, there exist two analytic trees 121 and 122:

"Hoobar-HA-NOMINATIVE Simon City History Art Museum-WO-ACCUSATIVE support", and

"Hoobar-GA-NOMINATIVE Simon City History Art Museum-WO-ACCUSATIVE support"

with five entries (occurrence "5") and three entries (occurrence "3") respectively therein. For the sake of simplicity the number of elements will be treated as the unit score of analytic tree. The unit scores of both two analytic trees an cited above will be "5", accordingly.

When the analytic tree score accumulating unit 105 refers to the relational table 111 as shown in FIG. 16, there is indicated that "HA-NOMINATIVE" may be replaced with "GA-NOMINATIVE", and that the score will be rated to 0.6. The analytic tree score accumulating unit 105 then analyzes as follows:

When translating from first analytic tree 121 into the analytic tree 123

"Hoobar supports Simon City History Art Museum".

The importance score of "Hoobar" (rated to 1 if the word score rating is not introduced) is multiplied by 0.6 to obtain the unit score of the analytic tree 123 of 4.6 as the result of translation. As the number of entries is 5, then total score of 23 will be yielded.

Although "HA-NOMINATIVE" may be translated to "WO-ACCUSATIVE", the adjunct will not be translated because "support" already has "WO-ACCUSATIVE" relational dependency. The translation will be performed by taking account for the connectivity of adjuncts so as to confirm not to yield an unnatural sentence.

In a similar manner, the analytic tree 122 "Hoobar . . . " will be translated to the analytic tree 124 "Hoobar . . . ", with unit score of the resulting translation of 4.4, and the total score 4.4×3=13.2.

By summing the resulting scores with the original score, the score of the analytic tree 125

"Hoobar supports Simon city History Art Museum" will be "25+13.2=38.2", also the score of the analytic tree 126

"Hoobar supports Simon City History Art Museum" will be "15+23=38".

The analytic tree score accumulating unit 105 selects the former tree 125 of these two relational dependencies for merging. In order not to extract more than one sentence of the same meaning, the analytic tree 126 that was not selected will be eliminated from the analytic tree score accumulating unit 105.

As can be appreciated from the above discussion, scores may be accumulated by merging analytic trees if a tree may become the same as another tree when using the relational dependency translation based on the relational table, and by merging analytic trees having similar meaning if the structure of analytic trees is not identical.

Although every possible relational dependency has been described to be translated before merging, it may be conceivable also that the most frequent one is merged by enumerating all the types of relational dependencies for each of elementary items.

In addition it may be possible to choose which yields the highest score for each relational dependency This means that higher score will be adopted by calculating for each "occurrence of target tree+degression rate×occurrence of source tree". In the case of the relational dependencies of adjuncts to "Hoobar",

"HA-NOMINATIVE": 5+0.4×3=6.2,

"GA-NOMINATIVE": 3+0.6×5=6

"HA-NOMINATIVE"is higher score than "GA-NOMINATIVE". The adjunct "HA-NOMINATIVE" will be selected.

Although in the fourth preferred embodiment, the translation of analytic trees by using one relational table has been described, a plurality of translation tables may be provided for use with a specific purpose. For example different tables may be used for different verbs or in different contexts.

Now referring to FIG. 18, there is shown an example of relational table for verbs. In the relational table 112, translation rules are corresponding to subjective verb. This table is composed as follows:

First row: general translation rules. "NI-DATIVE" may be translated to "NITAISHITE-DATIVE" or "HE-DATIVE", with respective rate of 0.5 and 0.3.

Second row: if the depended verb is "go" then only the translation to "HE" is acceptable, with the rate of 0.8.

Third row: if the depended verb in "do" then only the translation to "NITAISHITE-DATIVE" is acceptable, with the rate of 0.6.

Fourth row: if the depended verb is "give" then the translation to "NITAISHITE-DATIVE" and to "HE-DATIVE" may be acceptable, with the rate of 0.6 and 0.5 respectively.

When the analytic tree score accumulating unit 105 translates the dependencies by referring to the relational table 112, it selects the dependency before translation from the relational table 112 then to conform to the depended verb. If there is another verb that conforms to the depended verb, it will use the list of candidates in that line. Otherwise, it will use the line of generic rules (marked as "-").

It may be conceivable to alter the rules in accordance with the structure.

Now referring to FIG. 19, there is shown an example of a relational table based on the natural language structure. A relational table 113 conforms to the structure of natural language of the target, with rules and rates being defined. The table is composed as follows:

First row: when converting passive voice to active, if the sentence is "A GA-NOMINATIVE B NI-DATIVE V SARERU (A is V-en by B)", then it will be "B GA-NOMINATIVE A WO-ACCUSATIVE V SURU (B V A)" with rating 0.7 for both A and B. (Here V-en is a past participle of a verb V)

Second row: when converting passive voice to active, if the sentence is "A GA-NOMINATIVE B KARA-FROM C SARERU (A is done C by B)" then it will be "B GA-NOMINATIVE WO-ACCUSATIVE C SURU (B does C to A)" with rating 0.7 for both A and B.

Third row: when converting causative to declarative, "B NI-DATIVE V SASERU (make B V)" will be "B GA-NOMINATIVE V SURU (B V)" with rating of B of 0.5.

Fourth row: when converting intransitive to transitive, "B GA-NOMINATIVE V SURU (B V)" will be "B WO-ACCUSATIVE V SURU (V B)" with rating of B of 0.5.

Fifth row: when converting transitive to intransitive, "B WO-ACCUSATIVE C SURU (B is done C)" will be "B GA-NOMINATIVE C SURU (B does C)" with rating of B of 0.5.

In order to use a table such as relational table 113, attributes (such as passive, causative, etc) are required to be labeled for each of generated analytic trees. The attributes may be added when the sentence analyzing unit 102 analyzes the structure, or when the analytic tree score accumulating unit 105 translates the relational dependencies.

When the analytic tree score accumulating unit 105 translates the dependencies, it refers to the attribute appended to the analytic tree in order to invoke the rules of, for example, the first and second columns in the case of the passive voice. At this point, dependencies will be rearranged such that, if there are "GA-NOMINATIVE" and "NI-DATIVE" then the rule of the first row will be applied to translate them into "WO-ACCUSATIVE" and "GA-NOMINATIVE" respectively so as to convert an passive attribute to an active attribute. At the same time, their respective depending words will be rated. If there are "GA-NOMINATIVE" and "KARA-FROM" then the rule of the second row will be applied.

Now considering the case of applying the rule of the fifth row. It is assumed that the verb it labeled as intransitive or transitive in the result of analysis. The correspondence of intransitive and transitive is assumed to be described in the dictionary used in the dependency analysis and to be labeled as an attribute of the verb in the analysis result. For example, when analyzing a sentence "cause a syntax error", the attribute Type: transitive Intransitive: occur is described to the verb "cause". If the rule in fifth row is applied to this sentence, the following operations should be performed:

(1) change the dependency adjunct WO-ACCUSATIVE to GA-NOMINATIVE in "cause a syntax error WO-ACCUSATIVE";

(2) rate the score of "syntax error" by 0.5; and (3) replace "cause" with "occur".

As a result, an analytic tree indicating that "a syntax error occurs" will be generated.

By using different dependency tables in different context, the analytic trees derived from the sentences having the same meaning may be unified if the expressions thereof may differ.

Now a fifth preferred embodiment according to the present invention will be described below in detail. The first to fourth embodiments as described above are to process documents written in Japanese, the fifth embodiment processes the documents written in English to generate a summary therefrom. It should be appreciated that in the following description of preferred embodiment, the characteristics in particular of the processing of English documents, which may be different from the processing of Japanese language will be discussed while the characteristics common with the processing of Japanese documents as described in the above first to fourth embodiments will be omitted.

In order to generate a summary of documents written in English according to the preferred embodiment, documents are to be analyzed similarly to the preceding embodiments. In this preferred embodiment, documents are analyzed based on the Lexical Functional Grammar (LFG) proposed by Bresnan in 1982. Now referring to FIG. 20, there is shown an example of document analyzed according to LFG. The analysis result from the syntax analysis of the documents according to LFG is referred to as feature structure, expressed as a list of pairs of attributes and its values. In FIG. 20, one single elementary structure is formed between "[" and "]". In the left columns of the elementary structure attributes of each element forming the document are placed, and in the right columns spaced apart from the left columns, values corresponding to the attributes listed in its left; the values corresponding to the attribute may be a string of characters, or another elementary structure comprised of attributes and values. An upper arrow "↑" within parentheses positioned immediately after the word in a value indicates that the word takes as an argument the value corresponding to the element located in the same parenthesis as this upper arrow. If the value corresponding to each attribute is shared, a common code such as [1] is placed at all locations of the shared value, except for only one location into which the shared value is described. In FIG. 20, some attributes such as tense (TENSE) and number (NUM) are omitted for the sake of simplicity.

When analyzing the structure of document "AAA constructed a factory" as shown in FIG. 20A according to LFG, the result of analysis may be expressed as the elementary structure 131 as shown in FIG. 20A. The elementary structure 131 is formed of tree attributes "PRED", "SUBJ", and "OBJ" located in left column, and the values placed in right column spaced apart from the left column, "construct (↑ SUBJ) (↑ OBJ)" [PRED 'AAA'], and [PRED 'factory']. Value [PRED 'AAA'] corresponding to the attribute "SUBJ" in the elementary structure 131 refers to another elementary structure 131a that takes "PRED" as attribute, and 'AAA" as value. Similarly, the value [PRED 'factory'] corresponding to the attribute "OBJ" of the elementary structure 131 refers to another elementary structure 131b that takes "PRED" as attribute, and 'factory' as value.

The value 'construct (↑ SUBJ)(↑ OBJ)' corresponding to the element "PRED" of the elementary structure 131 is formed of a word "construct" and two parenthesis (↑SUBJ) and (↑ OBJ). This indicates that the word "construct" takes as arguments respective values corresponding to "SUBJ" and "OBJ" placed in the parenthesis. As the value corresponding to "SUBJ" is the elementary structure 131a, [PRED 'AAA'], and the value of the elementary structure 131a is 'AAA', an argument of "construct" is 'AAA'. In a similar manner, the value corresponding to "OBJ" is the elementary structure 131b, [PRED 'factory'], and the value of the elementary structure 131b is 'factory' so that 'factory' also is another argument of "construct".

The value [PRED 'factory'] corresponding to the attribute "HEAD" of the elementary structure 132 of the sentence "the factory constructed by AAA" as shown in FIG. 20B refers to another elementary structure 132a that takes "PRED" as attribute and 'factory' as its value. Similarly, the value corresponding to the attribute "MOD" of the elementary structure 132 refers to another elementary structure 132b that has its attribute "OBJ" and the corresponding value [1]. The common code [1] at the position of the elementary structure 132ba and the elementary structure 132a indicates that the elementary structure 132ba is the elementary structure 132a itself.

The value corresponding to the attribute "PRED" of the elementary structure 132b is 'build (↑ BY OBJ) (↑ OBJ)', indicating that "build" refers as arguments to the value corresponding to the attribute "BY" i.e., the value of attribute "OBJ" of another elementary structure 132bb, and the value of attribute "OBJ" of the elementary structure 132b. The value of attribute "OBJ" of the elementary structure 132bb is still another elementary structure [PRED 'AAA'], and the value of [PRED 'AAA'] is 'AAA', therefore the argument of "build" will be 'AAA'. The value of attribute "OBJ" of the elementary structure 132b refers to the elementary structure 132ba, the value of the elementary structure 132ba is 'factory' thus 'factory' will also be another argument of "build".

In the structure analysis of the preferred embodiment a procedure is used in which the structure may be determined when the result has been interpreted. However, another procedure such as HPSG proposed by Pollard & Sag et al., in 1987, may be used in which "PRED" indicating the meaning of document is prompted at the time of analysis.

Figure 21:
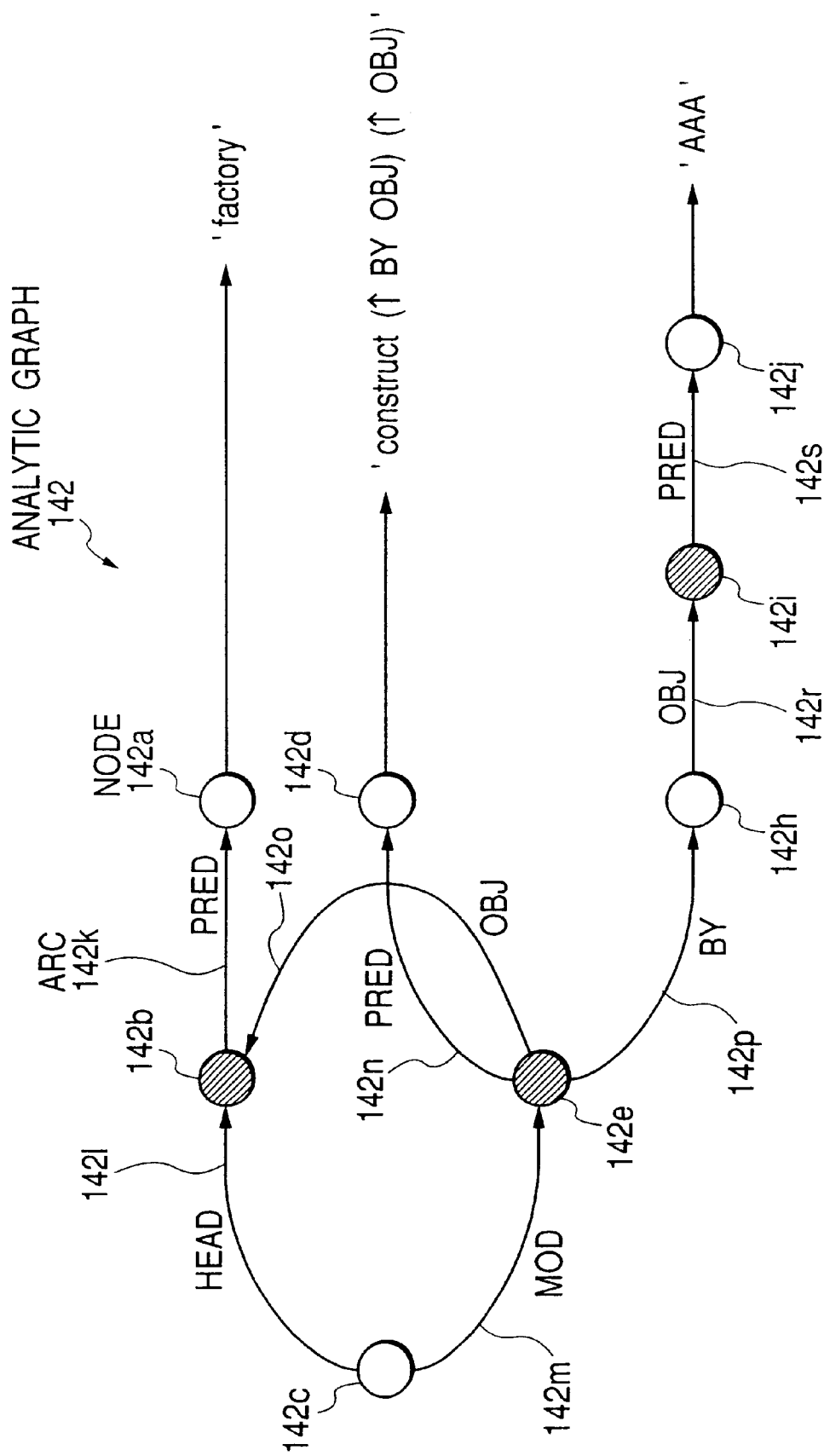
FIG. 21 is an example of analysis graph illustrating the feature structure shown in FIG. 20B as a graph.

Now referring to FIG. 21, there is shown an example of analysis graph 142 illustrating the feature structure structure 132 shown in FIG. 20B as a graph.

An analysis graph 142 in comprised of arcs 142k, 142l, 142m, 142n, 142o, 142p, 142q, 142r, 142e indicating attributes, and nodes 142a, 142b, 142c, 142d, 142e, 142f, 142h, 142i, 142j indicating values corresponding to the attributes. In this preferred embodiment, nodes having PRED element in the arc in the analysis graph 142 having the structure analyzed will be gathered to normalize to generate subgraphs. In FIG. 21, the nodes 142b, 142e, 142i shown by shadow have PRED element in the arc.

For normalization, nodes having a PRED element in the arc will be retrieved. In the embodiment shown in FIG. 21, nodes 142b, 142e, 142f, 142i will be retrieved. The contents of thus retrieved nodes 412b, 142e, 142f, 142i are as follows. Node 142b; PRED 'factory', Node 142e: PRED 'construct (↑ BY OBJ) (↑ OBJ)', Node 142f: PRED 'factory', and Node 12i: FRED 'AAA'.

These retrieved nodes will be used for normalization. The normalization will be done by describing in unified style the nodes having an argument with the nodes supplying an argument to the nodes having an argument. In FIG. 21, the node having argument is the node 142e, and the nodes supplying an argument are the nodes 142b and 142i. When normalizing nodes, the nodes supplying an argument will be unified, since these are determined to be the some kind of nodes if they can supply the same argument, irrespective to the origin of an argument. In the embodiment shown in FIG. 21, the nodes 142b and 142f contain the same contents, PRED 'factory', supplying an argument to the contents of node 142e, PRED 'construct (↑ BY OBJ) (↑ OBJ)'. In order to unify the expression of the argument-supplier nodes, elements arg1, arg2, . . . will be introduced to replace the elementary expression. In the example of FIG. 21, the element "BY OBJ" will be replaced with the element "arg2", and the element "OBJ" with "arg1".

Figure 22:
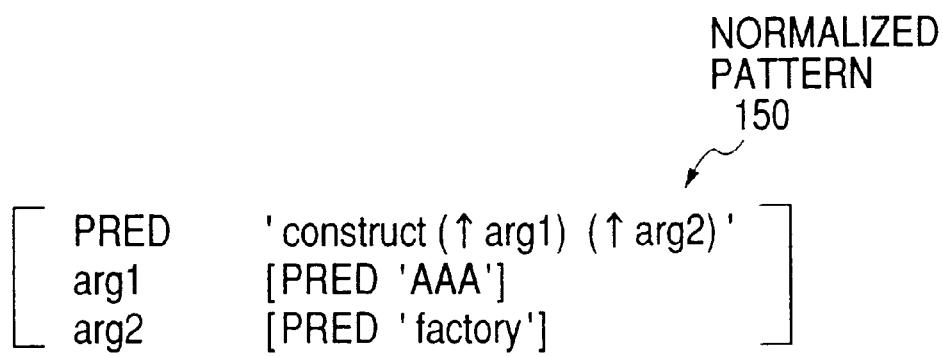
FIG. 22 is an example of standard pattern of the feature structure.

By retrieving the nodes having PRED element in the arc from the analysis graph 142 shown in FIG. 21 to replace the elementary expression to unify the nodes supplying the same argument, a normalized pattern 150 an shown in FIG. 22 will be obtained. Other documents will be converted to the normalized pattern in a similar manner to accumulate thus converted normalized patterns as subgraphs. The accumulation of scores will be performed by gathering same subgraphs, in a manner similar to the case of accumulation of scores to the analytic trees by the analytic tree score accumulating unit in the preceding first through fourth preferred embodiments. The accumulation of subgraphs may be done by for example gathering subgraphs of the same kind, or by unifying (Shieber, 1986) subgraphs that have been just generated with the subgraphs that was already obtained such that the subgraphs having the elementary structure different from others already obtained may be registered as another kind. The subgraphs may be gathered after having converted with a thesaurus as described above in the third preferred embodiment. In the latter case, if 'make' is defined as an upper class concept of 'construct' and 'build', the nodes having value 'construct' or 'build' in PRED can be gathered as a set of subgraphs having value 'make' in FRED.

After accumulating scores of subgraphs, a subgraph having the highest score will be picked up, in a similar manner to the preceding first through fourth preferred embodiments above, synthesized to generate a summary. It should be noted that in this embodiment another subgraph synthesizing method will be required which should be different from the preceding first to fourth embodiments generating a summary from documents written in Japanese, because a summary for documents written in English should be generated.

A method for synthesizing subgraphs in accordance with the preferred embodiment will be described below in detail.

For synthesizing subgraphs that have been retrieved, a type of summary to be generated may be specified. The types of summary include a verbal phrase type (V), a noun phrase type (NP), a gerund type (V-ing) and so on. The user of the document summarizing apparatus in accordance with the preferred embodiment may arbitrarily select one appropriate style.

After the selection of summary style, the pattern for generating summary may be specified. The sentence synthesizing unit in the document summarizing apparatus in accordance with the preferred embodiment contains a pattern dictionary that stores a variety of elementary structures, styles, and generating patterns, and is indexed by the PRED element, so as to search in the pattern dictionary with the elementary structure and selected style of the retrieved subgraph to determine a pattern to be generated. For the pattern dictionary search, the PRED element of the retrieved subgraph should be obtained to refer to the index of pattern dictionary with the retrieved PRED element to obtain a set of entries of pattern dictionary corresponding to the index matched to the retrieved PRED element.

After the extraction of a set of entries of pattern dictionary, the elementary structure of the entries extracted from the pattern dictionary will be unified with the elementary structure of the extracted subgraphs to extract therefrom the entries of pattern dictionary having the elementary structure matched to the retrieved subgraphs. Then the style of the entries of pattern dictionary having a matched elementary structure will be compared with the selected style to further extract therefrom the entries of pattern dictionary having the same style and the same elementary structure as the extracted subgraphs.

By picking up the pattern to be generated of the entries of pattern dictionary having thus extracted, value of elements such as arg1, arg2, . . . etc. of the extracted subgraphs will be substituted into the "element", which is the part having an argument in the pattern to be generated. If the pattern substituted with the value of elements arg1, arg2, . . . contains a character string, the string may be held as a partial string. Otherwise if the pattern substituted with the value of elements contains another elementary structure, then the matching to the pattern dictionary as described above will be recursively applied to ultimately obtain some partial strings. Thereafter, a summary may be generated by concatenating partial strings thus obtained.

The method of synthesizing subgraphs as described above will be further described more specifically by way of example. In the description hereinafter, the normalized pattern 150 shown in FIG. 22 is assumed to be picked up for the subgraph having the highest score, and NP is assumed to be selected as the summary style to be generated.

Figure 23:
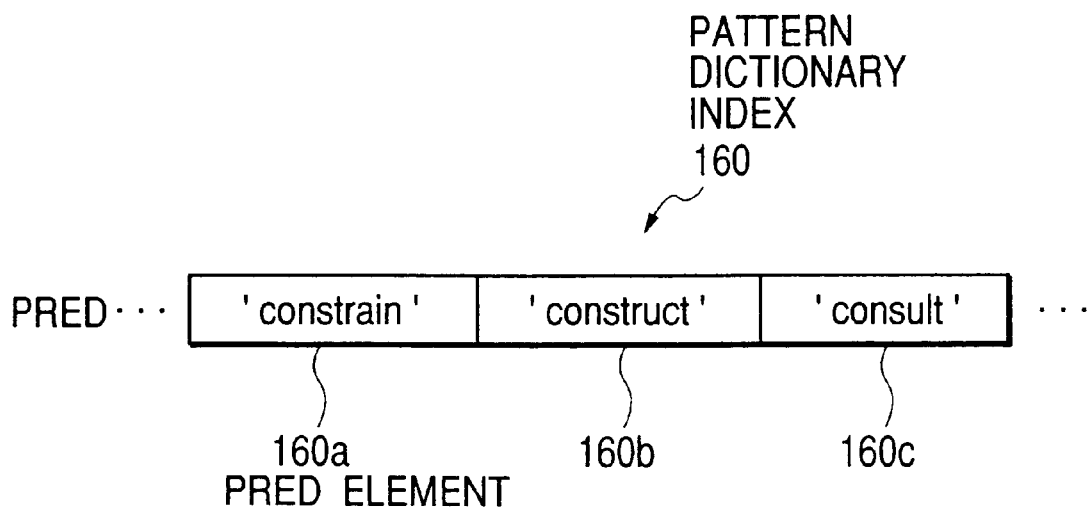
FIG. 23 is a schematic diagram illustrating a pattern dictionary index.

Now referring to FIG. 23, there is shown a schematic diagram illustrating a pattern dictionary index 160.

A pattern dictionary index 160 contains indexes of a variety of FRED elements 160a, 160b, and 160c such as 'constrain', 'construct' and 'consult'. As the PRED element of the normalized pattern 150, which is the subgraph retrieved, is 'construct', the corresponding PRED element 160b of the pattern dictionary index 160 will be selected. Once the PRED element 160b has been selected, some pattern dictionary entries corresponding to the indexed PRED element 160b will be picked up from the pattern dictionary as a set of elementary structure, style, and pattern to be generated.

Now referring to FIG. 24, there is shown a schematic diagram illustrating a pattern dictionary entry 161. FIG. 24A designates to a whole pattern dictionary entry 161, FIG. 24B to the elementary structures 162a of FIG. 24A, and FIG. 24C to the elementary structure 162b of FIG. 24A.

Now assuming that the elementary structure 162a and 162b match to the elementary structure of normalized pattern 150 as the result of unification of the elementary structures in the pattern dictionary entry 161 with the elementary structure of the normalized pattern 150, i.e., with the retrieved subgraph. As shown in FIG. 24A, there are two styles, "S" and "NP", which correspond to the elementary structure 162a, 162b in the pattern dictionary entry 161. In this specific example "NP" is selected for the styles so the pattern of the pattern dictionary entry matching with the elementary structure and style of the normalized pattern 150 of the retrieved subgraph will be the pattern 164c, indicated as '(POSSESS arg1) construction of (NP arg2)'.

Then the values of "arg1" and "arg2" of the normalized pattern 150 will be substituted to the pattern 164c. Since the value of "arg1" has another elementary structure [PRED 'AAA'], this value is substituted to the element "(POSSESS arg1)" to recursively apply the algorithm as described above with "POSSESS" being the style. As a result, the string "AAA's" is assumed here to be obtained. Furthermore, the value "arg2" has another elementary structure [PRED 'factory'], which is substituted to the element "(NP arg2)" to recursively apply the algorithm as described above to obtain a string "a factory".

Thus obtained strings "AAA's" "a factory" and the string "construction of" that the pattern 164c possesses will be concatenated to yield "AAA's construction of a factory".

Figure 25:
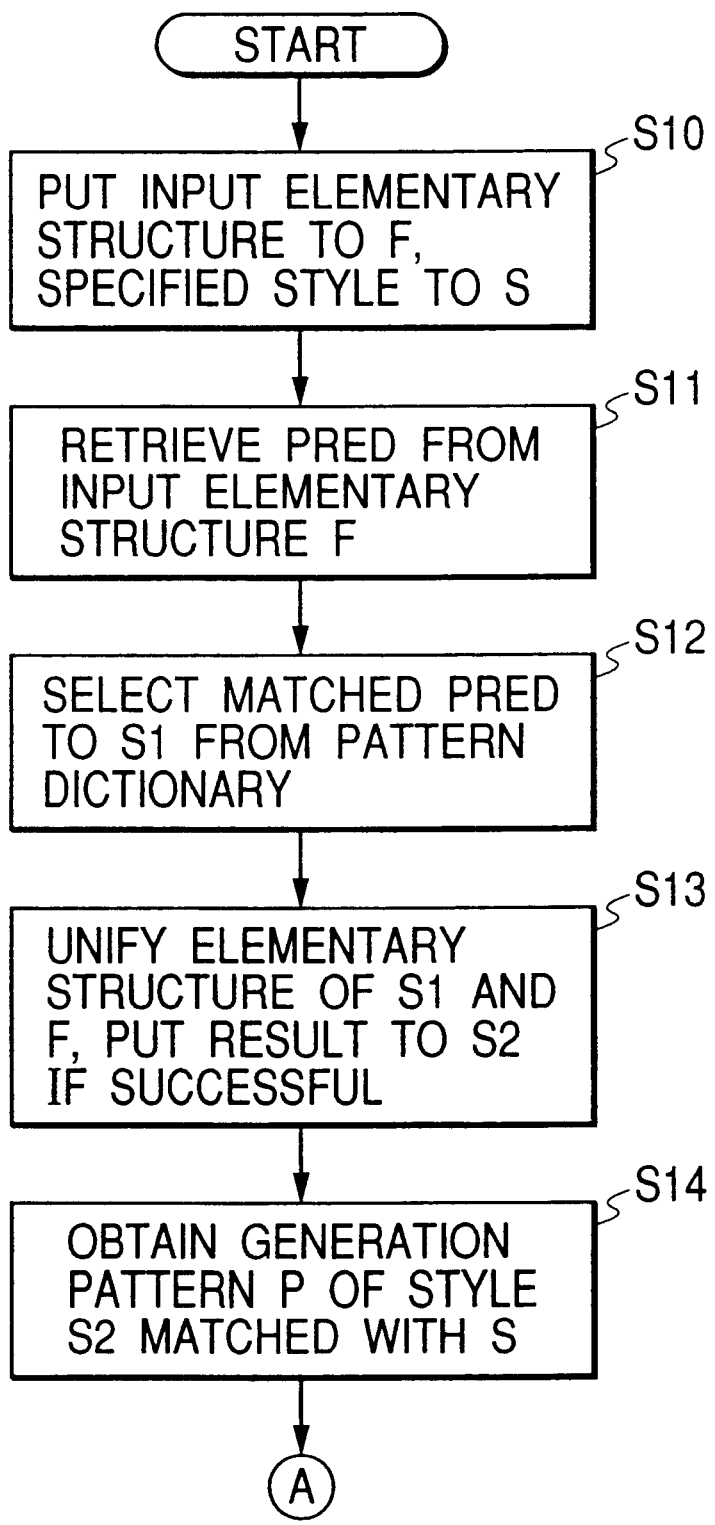
FIG. 25 is a flowchart illustrating a subgraph synthesizing process.
Figure 26:
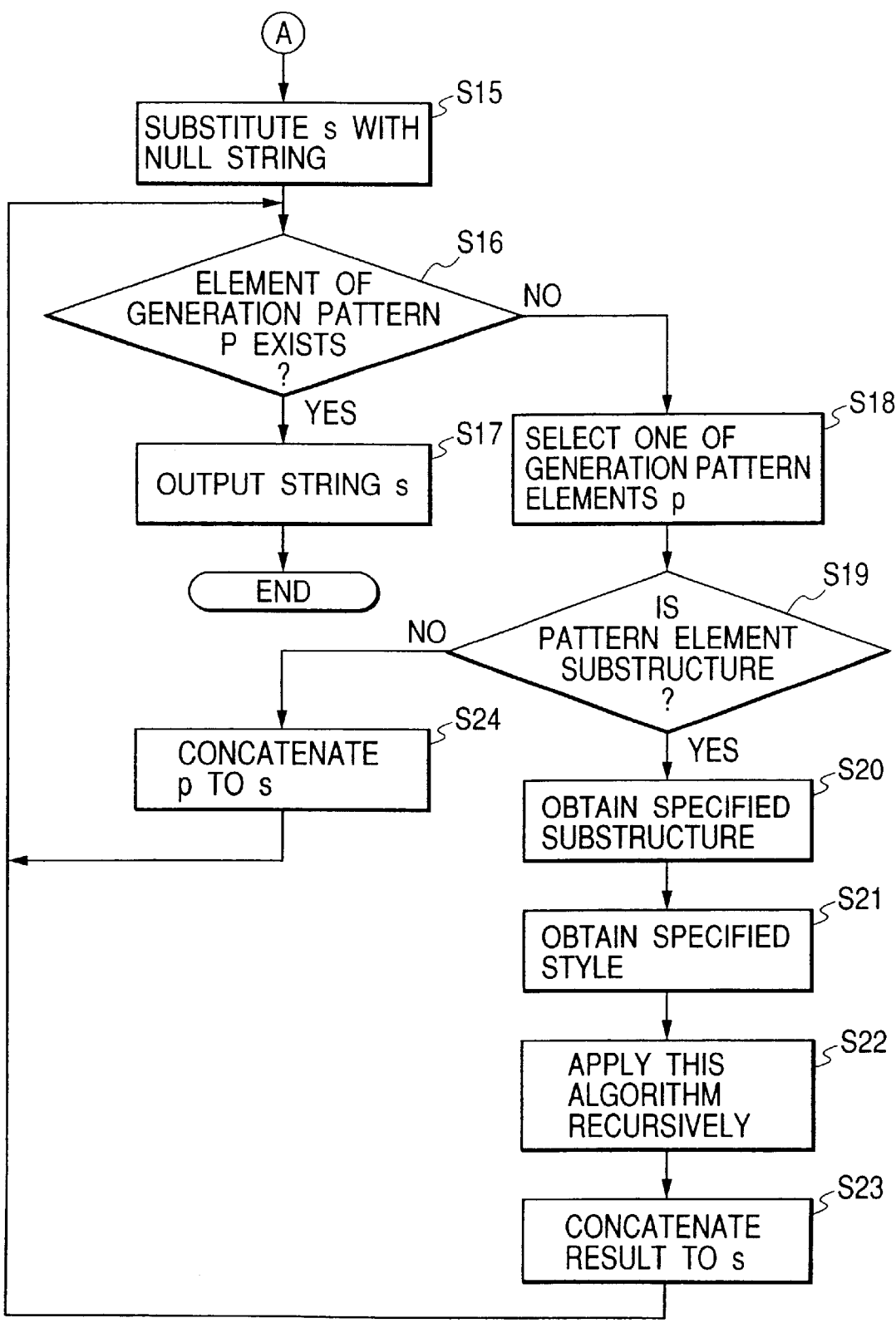
FIG. 26 is a flowchart illustrating another subgraph synthesizing process.

Now referring to the flowcharts shown in FIG. 25 and FIG. 26, the method for synthesizing subgraphs will be further described.

[S10] put into F an input elementary structure of the subgraph having the highest score, and put into S the selected style;

[S11] retrieve PRED element from F;

[S12] select matching PRED elements from the pattern dictionary to put into S1;

[S13] unify the elementary structures of S1 with F to put into S2 if successful;

[S14] retrieve from within S2 the pattern P of which the style matches to S;

[S15] substitute null string into the string "s" that is the final summary to be generated in order to initialize the string "s"

[S16] determine whether or not P contains "elements" with an argument. If P contains no "element" then the step proceeds to S17, otherwise, if P contains "elements" then the step proceeds to S18;

[S17] output the string "s", which has strings of P concatenated:

[S18] retrieve one element "p" from P to substitute its argument;

[S19] determine whether or not substituted "p" contains still another elementary structure. If "p" contains another elementary structure, then the step proceeds to S20, otherwise, if it contains no elementary structure, then the step proceeds to S24;

[S20] retrieve another element "p" having another elementary structure;

[S21] retrieve the specified style;

[S22] recursively apply the algorithm from S10 to S24;

[S23] concatenate the result obtained in step S22 to "s";

[S24] concatenate "p" to "s".

As can be appreciated from the description above, a summary may be generated by analyzing the structure of documents written in English, generating analysis graphs from the analysis results, extracting subgraphs therefrom, adding scores to the extracted subgraphs, picking up a subgraph having the largest accumulated score, and checking thus retrieved subgraph with a Pattern dictionary, allowing to yield the effect for the documents written in English identical to the first to fourth embodiments above for Japanese documents.

In this embodiment the pattern dictionary comprises three elements i.e., "elementary structure", "style" and "pattern to be generated", however the pattern dictionary may be of two elements, "elementary structure" and "pattern to be generated" by incorporating the "style" into part of "elementary structure".

The pattern dictionary may also be structured by eliminating "pattern to be generated" and putting superficial cases into the elementary structures. In such a structure, if unified successfully, a superficial phrase will be provided in the elementary structure.

Although in the present embodiment a pattern to be generated is provided one by one for each PRED, it is conceivable to provide generic conjugated pattern of words to apply to the pattern expressed in the unconjugated fundamental pattern of words, since most English words conjugate regularly. In such a case, a pattern having the fundamental word 'construct' may be provided as shown in the pattern 164b of FIG. 24, the pattern including 'constructing', the progressive of "construct" may be indicated as '*-ing' so that 'construct' of the pattern 164b will be conjugated by using '*-ing'.

The process as described above may be achieved by using a computer. The contents of the functional process that the document summarizing apparatus should incorporate may be written as a program to be stored on a computer readable recording medium. This program may be executed on a computer to achieve the process as described above. The computer-readable media comprises such device as magnetic storage devices and semiconductor memories. Furthermore, the program may be stored in a portable medium such as CD-ROM (compact disk read-only memory) or a floppy disk to distribute to the market, or the program may be stored in the storage of a computer connected to a network to transfer to another computer through a network. When executing on a computer, the program may be stored in a storage such as a hard disk of the computer and loaded into the main memory for execution.

The document summarizing apparatus as described above in accordance with the present invention generates a summary by generating analysis graphs from the documents to be processed, adding scores to the graphs, accumulating the score of graphs of the same kind, and picking up the analysis graphs with higher scores. The apparatus in accordance with the present invention may thereby generate a comprehensive summary without providing any severe limitation for the documents to be processed.

The document summarizing method in accordance with the present invention synthesizes a summary by generating analysis graphs from the sentences contained in the documents to be processed to select graphs with a higher importance level. The method in accordance with the present invention may thereby generate a comprehensive summary without providing any severe limitation for the documents to be processed.

The computer-readable recording medium containing the document summarizing program in accordance with the present invention may execute on a computer the stored document summarizing program so as to be able to perform on the computer the process of generating analysis graphs from the sentences of the documents to be processed in order to synthesize a summary by using the analysis graphs with a higher importance level.

What is claimed is:

1. A document summarizing apparatus for generating a summary of a set of documents, comprising:

a sentence analyzing unit that analyzes the syntax of sentences contained in the documents specified to be processed to generate an analysis graph describing the relational dependencies between words;

an analysis graph scoring unit that scores the analysis graph generated by said sentence analyzing unit based on importance;

an analysis graph score accumulating unit that stores the analysis graphs scored by said analysis graph scoring unit to combine the analysis graphs having the same concept to increase the scores given to the combined analysis graphs according to the combined contents; and a sentence synthesizing unit that selects graphs with higher scores from a group of analysis graphs stored in said analysis graph score accumulating unit when the analysis graphs have been generated from specified documents to be processed and accumulated in said analysis graph score accumulating unit, in order to synthesize a summarizing sentence based on the selected analysis graphs.

2. The document summarizing apparatus according to claim 1, further comprising:

an analysis graph expanding unit that expands the analysis graph generated by said sentence analyzing unit to generate subgraphs thereof, wherein said analysis graph scoring unit scores in compliance with the importance level by treating the subgraphs generated by said analysis graph expanding unit as independent analysis graphs.

3. The document summarizing apparatus according to claim 1, further comprising:

a word scoring unit that calculates the importance score for each elementary word contained in the documents specified to be processed, wherein said analysis graph scoring unit calculates the score of analysis graphs by using said importance score calculated in said word scoring unit for each elementary word of said analysis graphs.

4. The document summarizing apparatus according to claim 1, further comprising:

a thesaurus that manages the containment of meaning between words; and an analysis graph translating unit that uses said thesaurus to convert from the analysis graphs generated by said sentence analyzing unit to analysis graphs that the elementary words are translated into words having a concept semantically related, wherein said analysis graph scoring unit evaluates the analysis graphs yielded by said analysis graph translating unit at a lower score than the original analysis graphs thereof in response to the translated level.

5. The document summarizing apparatus according to claim 1, further comprising:

a relational table holding unit that holds a relational table defining translation rules for translating relational dependencies between words without altering the meaning of sentence, wherein said analysis graph score accumulating unit detects a pair of analysis graphs that ultimately results in the identical analysis graph when said analysis graphs are translated in compliance with the relational table held by said relational table holding unit so as to subtract the score of one analysis graph of the pair in response to the translation level and to add that score to the score of another analysis graph of the pair.

6. The document summarizing apparatus according to claim 1, wherein said sentence synthesizing unit includes patterns for synthesizing said summary, said patterns corresponding to said analysis graphs and its styles in order to select one pattern for synthesizing said summary when said analysis graph and said style are supplied to said unit.

7. The document summarizing method for generating a summary from a group of documents, comprising the steps of:

analyzing the syntax of sentences contained in the documents specified to be processed to generate an analysis graph describing the relational dependencies between words;

scoring the analysis graph generated by the sentence analyzing unit based on importance;

storing the scored analysis graphs to combine the analysis graphs having the same concept one with another to increase the scores given to the combined analysis graphs according to the combined contents;

synthesizing a summarizing sentence based on the selected analysis graphs by selecting graphs with higher scores from the group of stored analysis graphs when the analysis graphs have been generated and accumulated from specified documents to be processed.

8. A computer-readable recording medium carrying a document summarizing program for generating by a computer a summary from a set of documents comprising a document summarizing program for use with a computer, including:

a sentence analyzing unit that analyzes the syntax of sentences contained in the documents specified to be processed to generate an analysis graph describing the relational dependencies between words;

an analysis graph scoring unit that scores the analysis graph generated by said sentence analyzing unit based on importance:

an analysis graph score accumulating unit that stores the analysis graphs scored by said analysis graph soaring unit to combine the analysis graphs having the same concept to increase the scores given to the combined analysis graphs according to the combined contents; and a sentence synthesizing unit that selects graphs with higher scores from the group of analysis graphs stored in said analysis graph score accumulating unit when the analysis graphs have been generated from specified documents to be processed and accumulated in said analysis graph score accumulating unit, in order to synthesize a summarizing sentence based on the selected analysis graphs.

* * * * *